United States Patent
Whitt et al.

(10) Patent No.: US 12,320,652 B2
(45) Date of Patent: *Jun. 3, 2025

(54) APPARATUSES, SYSTEMS, AND METHODS FOR INCREASING SAFETY IN PERSONAL MOBILITY VEHICLE OPERATION

(71) Applicant: Lyft, Inc., San Francisco, CA (US)

(72) Inventors: Carlos Ellis Whitt, San Francisco, CA (US); Steven James Martisauskas, San Francisco, CA (US); Dor Levi, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/699,763

(22) Filed: Mar. 21, 2022

(65) Prior Publication Data

US 2022/0332215 A1 Oct. 20, 2022

Related U.S. Application Data

(63) Continuation of application No. 16/181,325, filed on Nov. 5, 2018, now Pat. No. 11,285,840.

(Continued)

(51) Int. Cl.
*G01C 21/34* (2006.01)
*B60L 58/13* (2019.01)
(Continued)

(52) U.S. Cl.
CPC .......... *G01C 21/3423* (2013.01); *B60L 58/13* (2019.02); *B60Q 1/346* (2013.01);
(Continued)

(58) Field of Classification Search
None
See application file for complete search history.

(56) References Cited

U.S. PATENT DOCUMENTS 7,356,405 B1 4/2008 Nesbit
7,627,422 B2 12/2009 Adamczyk
(Continued)

FOREIGN PATENT DOCUMENTS

CN 104699686 A 6/2015
CN 105809087 A 7/2016
(Continued)

OTHER PUBLICATIONS

Schuijbroek, et al., Inventory rebalancing and vehicle routing in bike sharing systems, European Journal of Operational Research, 257 (2017):992-1004.
(Continued)

*Primary Examiner* — Abdhesh K Jha
(74) *Attorney, Agent, or Firm* — Baker Botts L.L.P.

(57) ABSTRACT

The disclosed computer-implemented method may include improving safety in operating personal mobility vehicles. The method may track and/or control personal mobility vehicles associated with dynamic transportation networks. The method may improve safety related to PMV operation by taking advantage of the various sources and types of information related to PMV operation that are available in the dynamic transportation network. Other methods, systems, and computer-readable media are disclosed.

20 Claims, 11 Drawing Sheets

Related U.S. Application Data

(60) Provisional application No. 62/681,661, filed on Jun. 6, 2018.

(51) Int. Cl.

| | |
|---|---|
| *B60Q 1/34* | (2006.01) |
| *B60Q 1/44* | (2006.01) |
| *B60R 25/24* | (2013.01) |
| *B60W 10/00* | (2006.01) |
| *B60W 10/08* | (2006.01) |
| *B60W 10/18* | (2012.01) |
| *B60W 10/20* | (2006.01) |
| *B60W 10/30* | (2006.01) |
| *B60W 50/12* | (2012.01) |
| *G01C 21/20* | (2006.01) |
| *G06Q 10/02* | (2012.01) |
| *G06Q 50/40* | (2024.01) |
| *G06V 20/56* | (2022.01) |
| *G07C 5/00* | (2006.01) |
| *G07C 5/08* | (2006.01) |
| *G07C 9/25* | (2020.01) |
| *G08G 1/01* | (2006.01) |
| *G08G 1/16* | (2006.01) |
| *H04W 4/02* | (2018.01) |
| *H04W 4/029* | (2018.01) |
| *H04W 4/40* | (2018.01) |

(52) U.S. Cl.
CPC ............ *B60Q 1/444* (2013.01); *B60R 25/245* (2013.01); *B60W 10/08* (2013.01); *B60W 10/18* (2013.01); *B60W 10/20* (2013.01); *B60W 10/30* (2013.01); *B60W 50/12* (2013.01); *G01C 21/20* (2013.01); *G01C 21/3415* (2013.01); *G01C 21/3438* (2013.01); *G01C 21/3461* (2013.01); *G01C 21/3492* (2013.01); *G06Q 10/02* (2013.01); *G06Q 50/40* (2024.01); *G06V 20/588* (2022.01); *G07C 5/004* (2013.01); *G07C 5/008* (2013.01); *G07C 5/0808* (2013.01); *G07C 9/25* (2020.01); *G08G 1/0125* (2013.01); *G08G 1/163* (2013.01); *G08G 1/165* (2013.01); *H04W 4/029* (2018.02); *H04W 4/40* (2018.02); *B60R 2325/205* (2013.01); *B60W 2300/365* (2013.01); *B60W 2510/244* (2013.01); *B60W 2552/00* (2020.02); *B60W 2552/15* (2020.02); *B60W 2710/086* (2013.01); *B60W 2710/18* (2013.01); *B60W 2710/20* (2013.01); *B60W 2710/30* (2013.01); *B60W 2720/10* (2013.01); *B62K 2202/00* (2013.01)

(56) References Cited

U.S. PATENT DOCUMENTS

| | | | |
|---|---|---|---|
| 10,029,683 B1* | 7/2018 | Ginther | ............... B60T 7/12 |
| 10,036,641 B1 | 7/2018 | Iland | |
| 10,346,772 B2 | 7/2019 | Mahmud | |
| 10,584,971 B1 | 3/2020 | Askeland | |
| 10,684,132 B2 | 6/2020 | Johnston | |
| 10,828,999 B1 | 11/2020 | Konrardy | |
| 11,117,488 B2 | 9/2021 | Whitt | |
| 11,135,941 B2 | 10/2021 | Whitt | |
| 11,186,200 B2 | 11/2021 | Whitt | |
| 11,279,256 B2 | 3/2022 | Whitt | |
| 11,285,840 B2 | 3/2022 | Whitt | |
| 11,386,168 B2* | 7/2022 | Ricci | ............... H04W 76/11 |
| 11,400,830 B2 | 8/2022 | Whitt | |
| 11,807,131 B2 | 11/2023 | Whitt | |
| 2008/0014908 A1 | 1/2008 | Vasant | |
| 2009/0069977 A1 | 3/2009 | Markyvech | |
| 2010/0036599 A1 | 2/2010 | Froeberg | |
| 2010/0042314 A1 | 2/2010 | Vogt | |
| 2010/0057358 A1 | 3/2010 | Winer | |
| 2010/0308984 A1 | 12/2010 | Ehrlich | |
| 2012/0232787 A1 | 9/2012 | Kunath | |
| 2013/0231824 A1 | 9/2013 | Wilson | |
| 2014/0074392 A1 | 3/2014 | Holm | |
| 2015/0314755 A1* | 11/2015 | Phelan | ............... B60R 25/102 |
| | | | 701/2 |
| 2016/0034845 A1 | 2/2016 | Hiyama | |
| 2016/0187150 A1 | 6/2016 | Sherman | |
| 2016/0231129 A1 | 8/2016 | Erez | |
| 2016/0320198 A1 | 11/2016 | Liu | |
| 2016/0368492 A1 | 12/2016 | Al-Stouhi | |
| 2017/0004712 A1* | 1/2017 | Yang | ............... G06Q 50/40 |
| 2017/0011324 A1 | 1/2017 | Truong | |
| 2017/0053209 A1 | 2/2017 | Céret | |
| 2017/0146354 A1 | 5/2017 | Boss | |
| 2017/0160094 A1 | 6/2017 | Zhang | |
| 2017/0167882 A1 | 6/2017 | Ulloa | |
| 2017/0178035 A1 | 6/2017 | Grimm | |
| 2017/0225742 A1 | 8/2017 | Hancock | |
| 2017/0314945 A1 | 11/2017 | König | |
| 2017/0328725 A1 | 11/2017 | Schlesinger | |
| 2017/0357914 A1 | 12/2017 | Tulabandhula | |
| 2018/0010915 A1 | 1/2018 | Wilhelm | |
| 2018/0089605 A1 | 3/2018 | Poornachandran | |
| 2018/0094943 A1 | 4/2018 | Grochocki | |
| 2018/0109764 A1 | 4/2018 | Schofield | |
| 2018/0114258 A1 | 4/2018 | Ross | |
| 2018/0118106 A1 | 5/2018 | You | |
| 2018/0208206 A1* | 7/2018 | Petrucci | ............... B60W 30/02 |
| 2018/0211337 A1 | 7/2018 | Ghaddar | |
| 2018/0356235 A1 | 12/2018 | Jang | |
| 2019/0049968 A1 | 2/2019 | Dean | |
| 2019/0130318 A1 | 5/2019 | Lee | |
| 2019/0146509 A1 | 5/2019 | Dean | |
| 2019/0178672 A1 | 6/2019 | Woolley | |
| 2019/0228466 A1 | 7/2019 | Kojima | |
| 2019/0324446 A1 | 10/2019 | Vanderzanden | |
| 2019/0360818 A1 | 11/2019 | Linder | |
| 2019/0383627 A1 | 12/2019 | Nangeroni | |
| 2020/0064147 A1 | 2/2020 | Sliney | |
| 2020/0151611 A1 | 5/2020 | Mcgavran | |
| 2020/0276990 A1 | 9/2020 | Lequio | |
| 2021/0146884 A1 | 5/2021 | Wang | |

FOREIGN PATENT DOCUMENTS

| | | | |
|---|---|---|---|
| DE | 102013222421 A1 | | 5/2014 |
| EP | 2034451 A1 | | 3/2009 |
| WO | WO-2017214964 A1 * | | 12/2017 |

OTHER PUBLICATIONS

International Search Report and Written Opinion for International Application No. PCT/US2019/035665, 8 pages.
International Search Report and Written Opinion for International Application No. PCT/US2019/035001, 9 pages.
International Search Report and Written Opinion for International Application No. PCT/US2019/035667, 10 pages.
International Search Report and Written Opinion for International Application No. PCT/US2019/035668, 10 pages.
International Search Report and Written Opinion for International Application No. PCT/US2019/035653, 10 pages.
International Search Report and Written Opinion for International Application No. PCT/US2019/035663, 9 pages.
Nilsson, et al., "Automated Highway Lane Changes of Long Vehicle Combinations: A Specific Comparison between Driver Model Based Control and Non-Linear Model Predictive Control," 2015 International Symposium on Innovations in Intelligent Systems and Applications (INISTA) Sep. 2-4, 2015, added to IFEE Xplore on Sep. 28, 2015, 8 pages.
Lin, et al., "VShare: A Wireless Social Network Aided Vehicle Sharing System Using Hierarchical Cloud Architecture," May 16, 2016, 12 pages.

(56) References Cited

OTHER PUBLICATIONS

Choo, et al., "Reliable Vehicle Selection Algorithm with Dynamic Mobility of Vehicle in Vehicular Cloud System," APNOMS 2017, 3 p. Nov. 2, 2017.

* cited by examiner

APPARATUSES, SYSTEMS, AND METHODS FOR INCREASING SAFETY IN PERSONAL MOBILITY VEHICLE OPERATION

CROSS REFERENCE TO RELATED APPLICATION

This application is a continuation under 35 U.S.C. § 120 of U.S. patent application Ser. No. 16/181,325, filed 5 Nov. 2018, wich claims the benefit, under 35 U.S.C. § 119(e), of U.S. Provisional Application No. 62/681,661, filed 6 Jun. 2018, the disclosure of which is incorporated, in its entirety, by this reference.

BACKGROUND

Some transportation services may provide transportation on demand, drawing from a transportation provider supply pool to meet the needs of those requesting transportation services as the needs arise. A transportation provider supply pool may include the use of personal mobility vehicles to fulfill transportation requests from transportation requestors. However, the use of personal mobility vehicles by transportation requestors may subject the transportation requestors and others in proximity to safety concerns. Safety concerns may arise for transportation requestors and others in proximity to transportation requestors operating personal mobility vehicles when the personal mobility vehicles or vehicles in proximity to the personal mobility vehicles are operated in an unsafe fashion.

Accordingly, operation of personal mobility vehicles by transportation requestors may pose safety concerns to transportation requestors, personal mobility vehicles, pedestrians, vehicles and vehicle operators.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
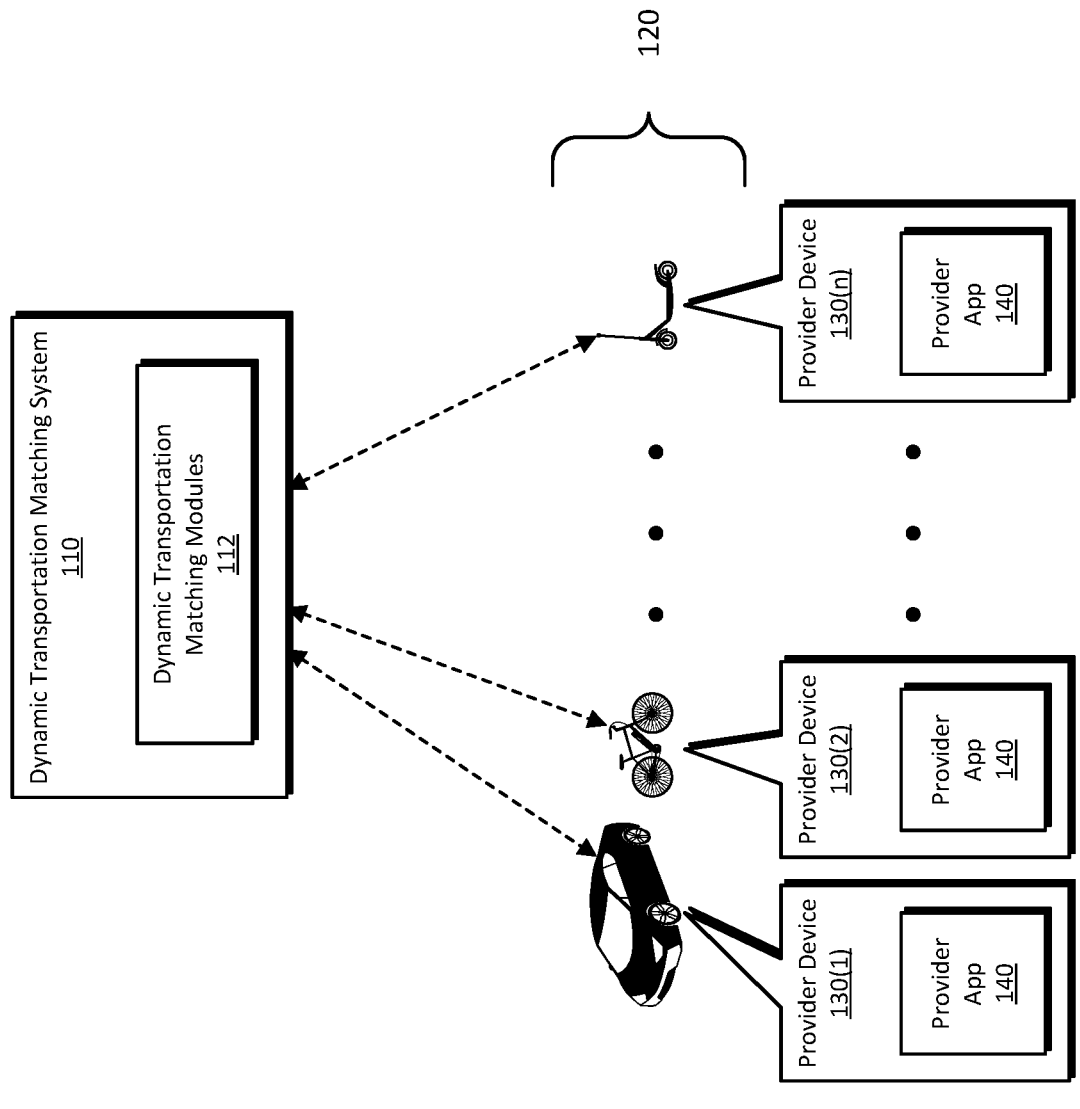
FIG. 1 is a block diagram of an example system for dynamic transportation with personal mobility vehicles.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to increasing safety in operating personal mobility vehicles, methods and systems for controlling, using, tracking, and/or interacting with personal mobility vehicles, and methods and systems for integrating personal mobility vehicles within dynamic transportation networks. The present disclosure describes methods of increasing safety related to PMV operation by taking advantage of the various sources and types of information related to PMV operation that are available in the dynamic transportation network. Limiting the performance of the PMV operation may help improve the experience and safety of the transportation requestor operating the PMV based on their level of experience.

The present method may provide various benefits to the transportation requestor operating a PMV which include, without limitation, increasing the safety of the transportation requestor and others in proximity to the transportation requestor operating the PMV. The present method may provide further benefits to the transportation requestor by increasing the efficiency of the transportation (e.g., providing an efficient travel route, ensuring arrival at a destination before power depletion of the PMV, etc.), and increasing the comfort of the transportation requestor during operation (e.g., directing the transportation requestor to bike lanes, directing the transportation requestor away from uncomfortable terrains and/or high traffic density routes, etc.).

The present method may provide various benefits to the dynamic transportation network which include, without limitation, increasing the efficiency of the dynamic transportation network, and increasing the satisfaction of the transportation requestor with the transportation service.

Accordingly, as may be appreciated, the systems and methods described herein may improve the functioning of a computer that implements methods of increasing safety in PMV operation. For example, these systems and methods may improve the functioning of the computer by improving dynamic transportation efficiency. Additionally or alternatively, these systems and methods may improve the functioning of the computer by reducing the computing resources consumed to identify usage information relating to the operation of a PMV (and, e.g., thereby freeing computing resources for other tasks, such as those directly and/or indirectly involved in dynamic transportation matching). In some examples, these systems and methods may improve the functioning of a computer controlling a PMV by using information gathered from the dynamic transportation network to control a transportation function in the PMV.

A dynamic transportation matching system may arrange transportation on an on-demand and/or ad-hoc basis by, e.g., matching one or more transportation requestors with one or more transportation providers. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include road-going vehicles (e.g., cars, light trucks, etc.). Furthermore, in some examples, as will be explained in greater detail below, the dynamic transportation network may include personal mobility vehicles.

As used herein, the term "personal mobility vehicle" (or "PMV") may refer to any of a variety of types of vehicles that may be smaller and/or lighter than traditional road-going vehicles. In some examples, a personal mobility vehicle may have fewer than four wheels. In some examples, personal mobility vehicles may be more flexible, maneuverable, and may be provided access to particular portions of a road way (e.g., bike lane, sidewalk, etc.) that traditional automobiles may not legally be able to access. Personal mobility vehicles may be human and/or motor powered and may have any suitable sized and/or powered motor to allow the personal mobility vehicle to travel any suitable speed and carry any suitable load. In some embodiments, without limitation, a personal mobility vehicle may operate with less than about five horsepower, less than about four horsepower, or less than about three horsepower. Notwithstanding the above examples, PMVs may operate at any suitable horsepower level (e.g., significantly higher horsepower levels). In various examples, without limitation, a personal mobility vehicle may weigh less than about 150 pounds, less than about 100 pounds, less than about 70 pounds, or less than about 50 pounds. Notwithstanding the above examples, PMVs may have any suitable weight. In various examples, without limitation, a personal mobility vehicle may operate at a maximum speed (e.g., absent downhill acceleration) of about 35 miles per hour or less, about 30 miles per hour or less, about 25 miles per hour or less, or about 20 miles per hour or less. Notwithstanding the above examples, PMVs may operate at any suitable speed (including, e.g., significantly higher speeds. In some examples, a personal mobility vehicle may be designed to transport a single passenger. However, in some embodiments, the personal mobility vehicles may also transport more than a single passenger (e.g., a tandem bicycle). In some examples, a personal mobility vehicle may be partially or fully self-powered (e.g., through a combustion motor or an electric motor). In some examples, a personal mobility vehicle may be partially or fully human-powered. Examples of personal mobility vehicles include, without limitation, scooters, unicycles, electric wheelchairs, powered bicycles, powered tricycles, human transporters, powered skateboards, pedaled bicycles, and electric bicycles. In some examples, a personal mobility vehicle may be maneuverable in a variety of situations (e.g., on a street, on a sidewalk, in a bike lane, etc.), may be light-weight relative to road-constrained vehicles, may be portable (e.g., capable of being picked up and moved by a single person without power assistance), may be lockable (e.g., in place and/or to a docking system) and/or may be adapted to be stored and/or locked outdoors (e.g., on a sidewalk) and/or in a docking system.

In some examples, a dynamic transportation matching system may match transportation requestors to personal mobility vehicles. For example, the dynamic transportation matching system may determine that a starting location of a transportation requestor is near an available personal mobility vehicle within the dynamic transportation network; provide, to the transportation requestor, directions to the personal mobility vehicle; and transmit instructions to the personal mobility vehicle to unlock and/or activate for the transportation requestor. The transportation requestor may then ride the personal mobility vehicle to a destination.

A wide variety of people having different levels of experience, skill, and physical attributes (e.g., age, weight, strength, etc.) may use PMVs in various operating environments. To accommodate people of different skill levels, ages, and behavioral profiles, systems described herein may modify the functionality of a PMV based on user characteristics and/or the context (e.g., geolocation) of the use. Thus, systems described herein may improve user experience and user safety while preserving PMV functionality.

In some examples, systems described herein may limit the speed of a PMV based at least in part on the detected terrain of the PMV. For example, the PMV may include one or more sensors (e.g., inertial measurement units, accelerometers, gyroscopes, etc.) that provide information for determining the speed, acceleration, position and/or orientation of the PMV (or of various components of the PMV) and may, based on data from the sensors, determine an incline of the terrain on which the PMV is traveling. Thus, for example, systems described herein may limit the speed of a PMV on a downhill incline (and, in some examples, on a flat incline). In some examples, systems described herein may determine whether the PMV is operating on a sidewalk to make a safety determination and/or perform a safety action. For example, systems described herein may use sensor information (e.g., accelerometer information, gyroscope, camera images, etc.) to determine the surface material on which the PMV is traveling is sidewalk material (e.g., concrete). Additionally or alternatively, systems described herein may use sensor information (e.g., accelerometer) to determine that the PMV has jumped a curb onto (or off from) a sidewalk. In response to determining that a transportation requestor is unsafely operating a PMV on a sidewalk (e.g., based on determining that the PMV is restricted from traveling on sidewalks and/or that the PMV has exceeded safe sidewalk speeds), systems described herein may modify at least one transportation function of the PMV. Examples of modifying a transportation function of a PMV include, without limitation, reducing the maximum speed of the PMV, providing feedback to the transportation requestor (e.g., in real time and/or after the trip has completed), disqualifying the requestor from future PMV use, etc. Real-time feedback to the requestor may include any of a variety of feedback methods, including, without limitation, haptic feedback (e.g., provided via the PMV), audio feedback (e.g., a warning buzzer, audible instructions, etc.) and visual feedback (e.g., warning lights on the PMV, a display device on the PMV, a heads up display, a head-mounted display, etc.).

In some examples, systems described herein may evaluate the ability of a transportation requestor to operate a PMV. For example, these systems may calculate an ability score based on any of a variety of factors, including, without limitation, the number of PMV rides (e.g., within a dynamic transportation network) taken by the transportation requestor, the number of successful (e.g., evaluated to be safe) rides taken by the transportation requestor, the monitored behavior of the user on the vehicle, the amount of time spent by the transportation requestor operating PMVs, the number and/or recency of PMV function modifications taken in response to the transportation requestor's operation of PMVs, etc. In some examples, these systems may additionally or alternatively use user-supplied information to evaluate the ability of the transportation requestor. For example, the transportation requestor may provide information about experience and/or comfort level with operating the PMV, and/or physical attributes (e.g., age weight, height, etc.) of the transportation requestor. According to some examples, systems described herein may restrict and/or unlock capabilities of the PMV based on the evaluated ability of the requestor. For example, systems described herein may unlock higher maximum speeds for the PMV based on determining that the ability score of the requestor exceeds a predetermined threshold.

In some examples, systems described herein may use geofences to apply safety controls to a PMV. For example, systems described herein may restrict use of a PMV outside of a geofenced area (e.g., based on determining that operation of the PMV outside the geofenced area is unsafe or otherwise not allowed). For example, systems described herein may identify streets designated as safe for PMV travel and/or streets designated as unsafe for PMV travel (or not designated as safe for PMV travel) and restrict use of the PMV on streets designated as unsafe. Additionally, the skill level of the transportation requestor and/or matched operator of the PMV may dictate which routes are authorized/safe for the user vs. unsafe/unauthorized for the user. For example, beginning users may only be authorized for travel on roads with clear bike paths and/or separated medians from vehicular traffic while more advanced users may be allowed access to roads that do not have designated bike paths, segments of roads outside a bike path, and/or uphill/downhill roads, etc. In some examples, systems described herein may activate a lock on the PMV, notify a user of the safety concern, and/or reduce or deactivate power to the PMV based on determining that the PMV is entering an unsafe or unauthorized area.

In some examples, systems described herein may enable parents to configure safety settings for children. For example, when a child requestor uses a PMV within a dynamic transportation network, a dynamic transportation management system may look up safety settings for the child requestor and apply the safety settings and/or transmit the safety settings to the PMV. Examples of safety settings include, without limitation, restricting areas of travel, providing parental notifications of areas of travel, safety violations, and/or accidents, and/or setting the maximum speed of the PMV.

In some examples, systems described herein may sense a requestor's state (e.g., in proper position to operate the PMV vs. not in proper position to operate the PMV; focused on operating the PMV vs. not focused on operating the PMV, etc.) to determine appropriate PMV function modifications. For example, systems described herein may sense whether both of a requestor's hands are on the handlebars of a PMV (and perform a PMV function modifications otherwise). In another example, systems described herein may pair with a requestor's mobile device and determine whether the mobile device is active (e.g., in a call), being operated during a ride, or if the mobile device otherwise indicates that a rider may be interacting with the mobile device instead of focusing on the road or operation of the PMV. Similarly, in these examples, systems described herein may perform a PMV function modification (e.g., lower the maximum speed of the PMV, lower the current speed of the PMV, apply a braking system of the PMV, send a message to the transportation requestor's mobile device, lock the PMV, and/or otherwise indicate the safety concern) if the transportation requestor is actively using the mobile device.

In some examples, systems described herein may verify that a transportation requestor is wearing safety equipment (e.g., a helmet) before activating and/or unlocking a PMV. For example, these systems may use camera-based face and helmet detection to determine that the transportation requestor is wearing a helmet.

Propulsion mechanisms (e.g., motors) of PMVs may operate at different power levels, with implications for safety (e.g., speed), efficiency (e.g., power consumption), and trip planning (e.g., whether a PMV will have sufficient power supply charge level to complete a trip). Systems described herein may use information about the use of the PMV (e.g., the incline on which the PMV is operating, the distance to a destination, etc.) to adjust the power level of the propulsion mechanism of the PMV according to the situation. In some examples, systems described herein may adjust the power level of the propulsion mechanism of the PMV based on the capabilities of the transportation requestor.

In some examples, systems described herein may use sensor data to determine the use of the PMV and/or the appropriate power level of the PMV. For example, systems described herein may use accelerometer data and/or gyroscope data to determine an incline on which the PMV is operating (and, e.g., provide greater power for uphill inclines and less power for flat and/or downhill inclines). Additionally or alternatively, systems described herein may use data from a torque sensor to determine an amount of torque applied by the propulsion mechanism of the PMV and adjust the power level of the propulsion mechanism of the PMV based on the determined torque.

In some examples, systems described herein may determine a route for a transportation requestor's trip based on a safety risk associated with alternative routes. For example, systems described herein may set a route based at least in part on a bike lane being within the route. As another example, systems described herein may set a route based at least in part on a hill being excluded from the route. In some examples, systems described herein may collect information about routes based on historical trips taken by a transportation requestor and/or other transportation requestors within a dynamic transportation network to determine a route for a PMV with an acceptable safety risk. For example, these systems may collect information on average and maximum speeds traveled by PMVs (e.g., within the dynamic transportation network) on various routes and/or transportation requestor feedback for various routes. In some examples, these systems may collect safety related data (e.g., number and severity of accidents). In some examples, these systems may detect potholes found in various routes (e.g., using sensor data from the PMV, including, e.g., accelerometer data). These systems may make future route determinations based on the collected pothole data. Additionally or alternatively, these systems may report pothole data (and/or any other road condition data) to municipalities.

As mentioned above, in some examples, systems described herein may determine the location of a PMV based on a variety of different methods. For example, systems may determine the location based on a GPS device integrated into the PMV. However, in some cases GPS information may be unavailable or imprecise. Accordingly, in some examples, systems described herein may use data from other transportation providers within a dynamic transportation network to determine the location of a PMV. For example, provider vehicles may include wireless communication devices capable of identifying and/or communicating with the PMV. Accordingly, systems described herein may determine the location of a PMV based at least in part on a location of a provider vehicle when the provider vehicle identifies the PMV via a wireless communication signal (e.g., a BLUETOOTH or WI-FI signal). In some examples, provider vehicles may include cameras, as systems described herein may determine the location of a PMV by receiving the location of a provider vehicle when the camera of a provider vehicle captures an image of the PMV. For example, a provider vehicle within a dynamic transportation network may travel past the PMV (e.g., while fulfilling a transportation request unrelated to the PMV). A camera within and/or mounted to the provider vehicle may capture street-level imagery (e.g., to produce street-level mapping data, to collect real-time street conditions for use within the dynamic transportation network, and/or to gather information about other vehicles within the dynamic transportation network). The street-level imagery captured by the provider vehicle may include an image of the PMV. By identifying the PMV from within the image of the PMV and correlating the image of the PMV with the location of the provider vehicle when the image was taken, systems described herein may determine a location of the PMV. In some examples, a PMV sensor may provide location information for the PMV. For example, the PMV may include a simultaneous localization and mapping (SLAM) system. Additionally or alternatively, the PMV may include a camera and systems described herein may determine the geolocation of the PMV based on a known location of a feature recognized in the camera of the PMV.

In some examples, systems described herein may use sensor information (e.g., from accelerometers and/or gyroscopes) to determine whether a PMV is tipped over. In some examples, these systems may determine, based at least in part on the PMV being tipped over (e.g., while traveling at speed) that an accident has occurred and/or that a PMV needs maintenance or service. Accordingly, the systems described herein may initiate contact with emergency services for the transportation requestor. In some examples, systems described herein may use sensor information (e.g., from accelerometers and/or gyroscopes) to determine that a PMV has been involved in an accident and record audio and/or video data from a period of time before the accident to a period of time after the accident has occurred.

In some examples, systems described herein may determine whether to apply brakes to front wheels or to back wheels based on sensor information. For example, systems described herein may derive motion information and/or weight distribution information to determine whether applying brakes at the front or the back would result in more safety and/or comfort for the transportation requestor.

In some examples, PMVs may include an anti-lock braking system which may function to reduce a safety risk. For example, a PMV may include one or more sensors (e.g., wheel rotation sensors) to detect locked brakes on the PMV and/or sliding wheels. Accordingly, systems described herein may engage an anti-lock braking system. In some examples, the anti-lock braking system may use sensor data available from the PMV (e.g., sensor data indicating the surface material on which the PMV is traveling) and/or historical usage data (e.g., data indicating the expected wear-and-tear on the wheels of the PMV based on past miles traveled and conditions traveled under derived from sensor data) to improve anti-lock braking performance.

In some examples, a PMV may autonomously reposition (e.g., to move toward a matched requestor and/or a location for meeting the requestor, to park in a dock or a virtual parking space, to move to a safe position, move to a geofenced virtual parking area, etc.). In some examples, the PMV may include a camera and the PMV may reposition based at least in part on the camera data (e.g., based on identified objects or locations from the image data).

In some examples, systems described herein may estimate the range of a PMV. These systems may estimate the range based on any of a variety of factors, including, without limitation, the charge of the charge storage device (e.g., battery), the temperature of the battery, the weight of the transportation requestor (e.g., based on strain gauge sensor data), the expected terrain of the route, and/or expected weather conditions (e.g., wind strength and direction).

In some examples, a PMV may include a rear-facing camera and systems described herein may alert a transportation requestor based on determining, in light of data from the rear-facing camera, that a collision is likely, that the transportation requestor is not looking at the road or otherwise is engaged with the ride, is not wearing a helmet or other safety equipment, and/or any other relevant situation.

FIG. 1 illustrates an example system 100 for matching transportation requests with a dynamic transportation network that includes personal mobility vehicles. As shown in FIG. 1, a dynamic transportation matching system 110 may be configured with one or more dynamic transportation matching modules 112 that may perform one or more of the steps described herein. Dynamic transportation matching system 110 may represent any computing system and/or set of computing systems capable of matching transportation requests. Dynamic transportation matching system 110 may be in communication with computing devices in each of a group of vehicles 120. Vehicles 120 may represent any vehicles that may fulfill transportation requests. In some examples, vehicles 120 may include disparate vehicle types and/or models. For example, vehicles 120 may include road-going vehicles and personal mobility vehicles. In some examples, some of vehicles 120 may be standard commercially available vehicles. According to some examples, some of vehicles 120 may be owned by separate individuals (e.g., transportation providers). Furthermore, while, in some examples, many or all of vehicles 120 may be human-operated, in some examples many of vehicles 120 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 1 does not specify the number of vehicles 120, it may be readily appreciated that the systems described herein are applicable to hundreds of vehicles, thousands of vehicles, or more. In one example, dynamic transportation matching system 110 may coordinate transportation matchings within a single region for 50,000 vehicles or more on a given day. In some examples, vehicles 120 may collectively form a dynamic transportation network that may provide transportation supply on an on-demand basis to transportation requestors.

As mentioned above, dynamic transportation matching system 110 may communicate with computing devices in each of vehicles 120. The computing devices may be any suitable type of computing device. In some examples, one or more of the computing devices may be integrated into the respective vehicles 120. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 110.

As shown in FIG. 1, vehicles 120 may include provider devices 130(1)-(n) (e.g., whether integrated into the vehicle, permanently affixed to the vehicle, temporarily affixed to the vehicle, worn by a driver of the vehicle, etc.). In some examples, provider devices 130 may include a provider app 140. Provider app 140 may represent any application, program, and/or module that may provide one or more services related to operating a vehicle and/or providing transportation matching services. For example, provider app 140 may include a transportation matching application for providers. In some examples, provider application 140 may match the user of provider app 140 (e.g., a transportation provider) with transportation requestors through communication with dynamic transportation matching system 110. In addition, and as is described in greater detail below, provider app 140 may provide dynamic transportation management system 110 with information about a provider (including, e.g., the current location of the provider) to enable dynamic transportation management system 110 to provide dynamic transportation matching and/or management services for the provider and one or more requestors. In some examples, provider app 140 may coordinate communications and/or a payment between a requestor and a provider. According to some embodiments, provider app 140 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a computing system installed in a PMV, a server computer system, or any other hardware platform capable of providing transportation matching services to one or more requestors and/or providers. The computing devices implementing the transportation matching system may the same devices, similar devices, and/or different devices. For example, the transportation matching system may match a transportation requestor device with a transportation provider device associated with a car (or similar road-constrained vehicle), with a device associated with a personal mobility vehicle, and/or a combination thereof.

Figure 2:
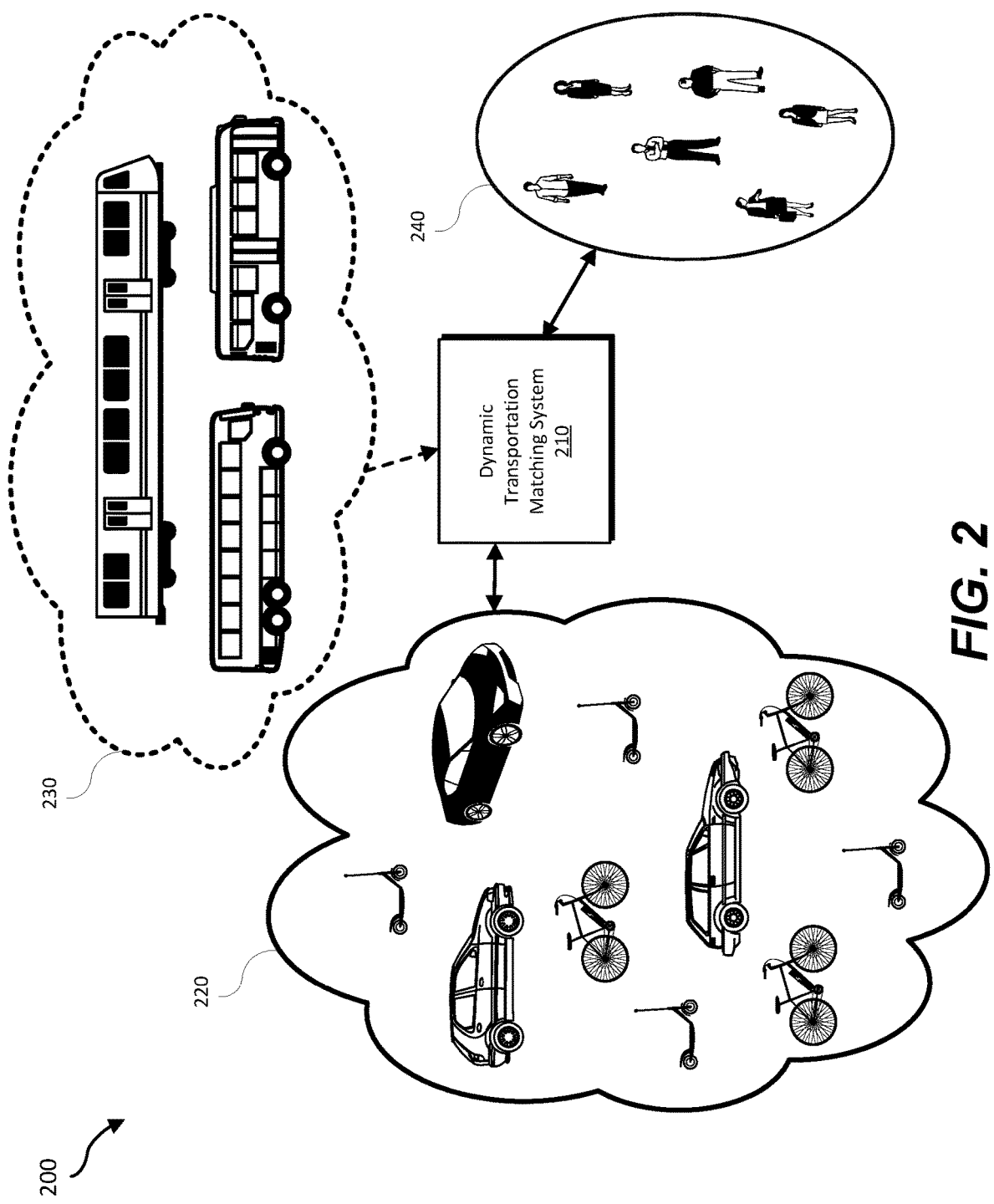
FIG. 2 is a block diagram of an example system that matches transportation requestors to transportation providers.

FIG. 2 shows an example system 200 for providing dynamic transportation with a dynamic transportation network that includes personal mobility vehicles. As shown in FIG. 2, vehicles 220 may include road-going vehicles (e.g., cars) as well as personal mobility vehicles (e.g., electronic scooters and electronic bicycles). Vehicles 220 may operate as part of a dynamic transportation network managed by dynamic transportation matching system 210. Thus, dynamic transportation matching system 210 may be in communication with vehicles 220 (and/or provider devices associated with vehicles 220) to receive information relevant to making transportation matches (e.g., location information, availability information, etc.) as well as to provide matching instructions once transportation matches have been made.

In addition to vehicles 220, in some examples dynamic transportation matching system 210 may also be in communication with vehicles 230. In some examples, vehicles 230 may not operate as a part of the dynamic transportation network. For example, dynamic transportation matching system 210 may not manage or direct vehicles 230. Instead, vehicles 230 may provide predictable and/or reliable transportation upon which dynamic transportation matching system 210 may rely when making matches. For example, vehicles 230 may include buses, subways, trains, and the like that may (i) run on fixed schedules known to dynamic transportation matching system 210 and/or (ii) make available information to transportation matching system 210 allowing transportation matching system 210 to predict departure and arrival times. While dynamic transportation matching system 210 may not manage or control vehicles 230, in some examples dynamic transportation matching system 210 may interact with systems that manage transportation provided by vehicles 230. For example, dynamic transportation matching system 210 may procure tickets to ride one or more vehicles 230 on behalf of one or more of requestors 240 and/or may notify one or more vehicles 230 of the status of one or more requestors 240. When dynamic transportation matching system 210 receives transportation requests from one or more of requestors 240, dynamic transportation matching system 210 may match the transportation request with one or more providers among vehicles 220 and/or vehicles 230 based on any of a variety of factors. For example, dynamic transportation matching system 210 may match the transportation request based on the current and/or projected location of and/or the current and/or projected availability of each candidate provider. In some examples, transportation matching system 210 may match the transportation request to a first provider instead of a second provider in order to maintain availability of the second provider for another current or prospective requestor. In some examples, dynamic transportation matching system 210 may match the transportation request based on a suitability of a candidate provider for the transportation request. For example, dynamic transportation matching system 210 may determine that a long-distance trip is suited for a road-going vehicle but may determine that a relatively short trip is suited for a personal mobility vehicle. In some examples, dynamic transportation matching system 210 may match a transportation request to multiple providers. For example, dynamic transportation matching system 210 may match a road-going vehicle to one leg of a trip, a mass transit vehicle to another leg of the trip, and a personal mobility vehicle to a third leg of the trip.

Figure 3:
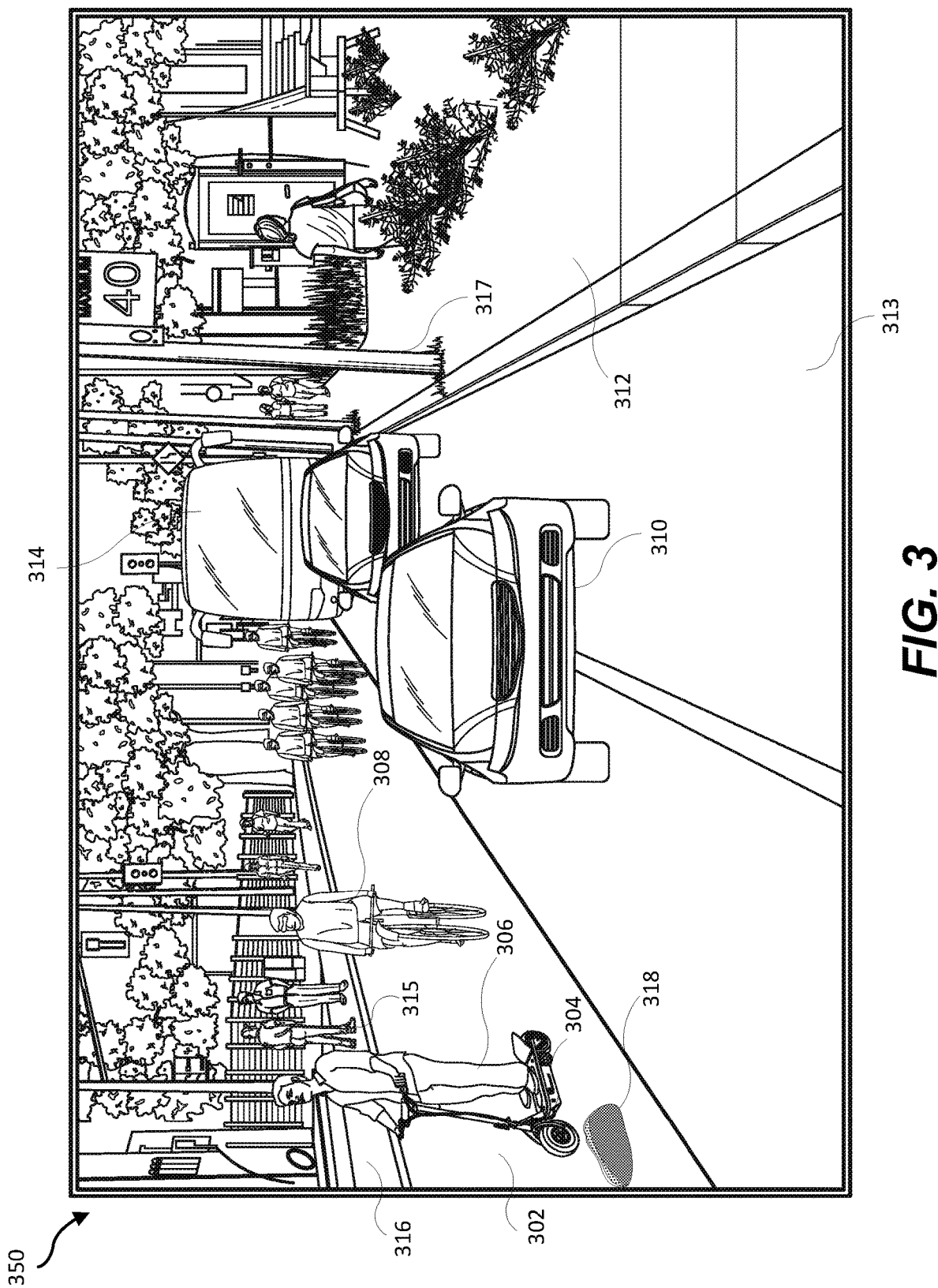
FIG. 3 illustrates a street view of a transportation requestor operating a personal mobility vehicle.

FIG. 3 illustrates a street view (e.g., urban street) of a transportation requestor operating a PMV. As shown in FIG. 3, transportation requestor 306 operates PMV 304 in bike lane 302. Bike lane 302 may also have other vehicles operating in proximity to transportation requestor 306. Bicycle rider 308 may operate in bike lane 308. Transportation requestor 306 may operate PMV 304 in proximity to street 313. Street 313 may also have other vehicles operating in proximity to transportation requestor 306. Car 310 and bus 314 may operate in street 314 in proximity to transportation requestor 306. Transportation requestor 306 may operate PMV 304 in proximity to sidewalks 312 and 316, pedestrian 315 and stationary obstacles including signpost 317 and pothole 318. In some examples, the density of traffic from pedestrians, cars, buses, bicycles, and other vehicles may increase the safety risk to the operation of PMV 304 by transportation requestor 306 due to potential collisions with the aforementioned objects. In order to reduce a safety risk of operating PMV 304 systems described herein may modify transportation functions of PMV 304 as described in more detail below.

Figure 4:
FIG. 4 is a plan view of a map including a transportation requestor operating a personal mobility vehicle within a geofence.

FIG. 4 is a plan view of map 450 including a transportation requestor operating a personal mobility vehicle within a geofence. As shown in FIG. 4, transportation requestor 403 may operate PMV 404 in a geographic area defined by geofence 401. Geofence 401 may define a boundary of an area in which operating parameters of PMV 404 are controlled differently from outside an area outside geofence 401. In some examples, PMV 404 may be permitted to be operated by transportation requestor 403 in geofence 401 but not permitted to operate in geofence 402. In some examples, PMV 404 may be permitted to operate in geofence 401 but not permitted to operate outside geofence 401 based on historical data. For examples, historical data collected in geofences 401 and 402 may indicate a higher safety risk exists for operating a PMV in geofence 401 as compared to operating a PMV in geofence 402. In some examples, transportation requestor 403 may only operate PMV 404 within geofence 401 due to restrictions placed upon transportation requestor 403 by a parent or guardian. In some examples, PMV 404 may be permitted to be operated by transportation requestor 403 in geofences 401 and 402 with different operating parameters including, without limitation, the maximum speed of PMV 404.

Figure 5:
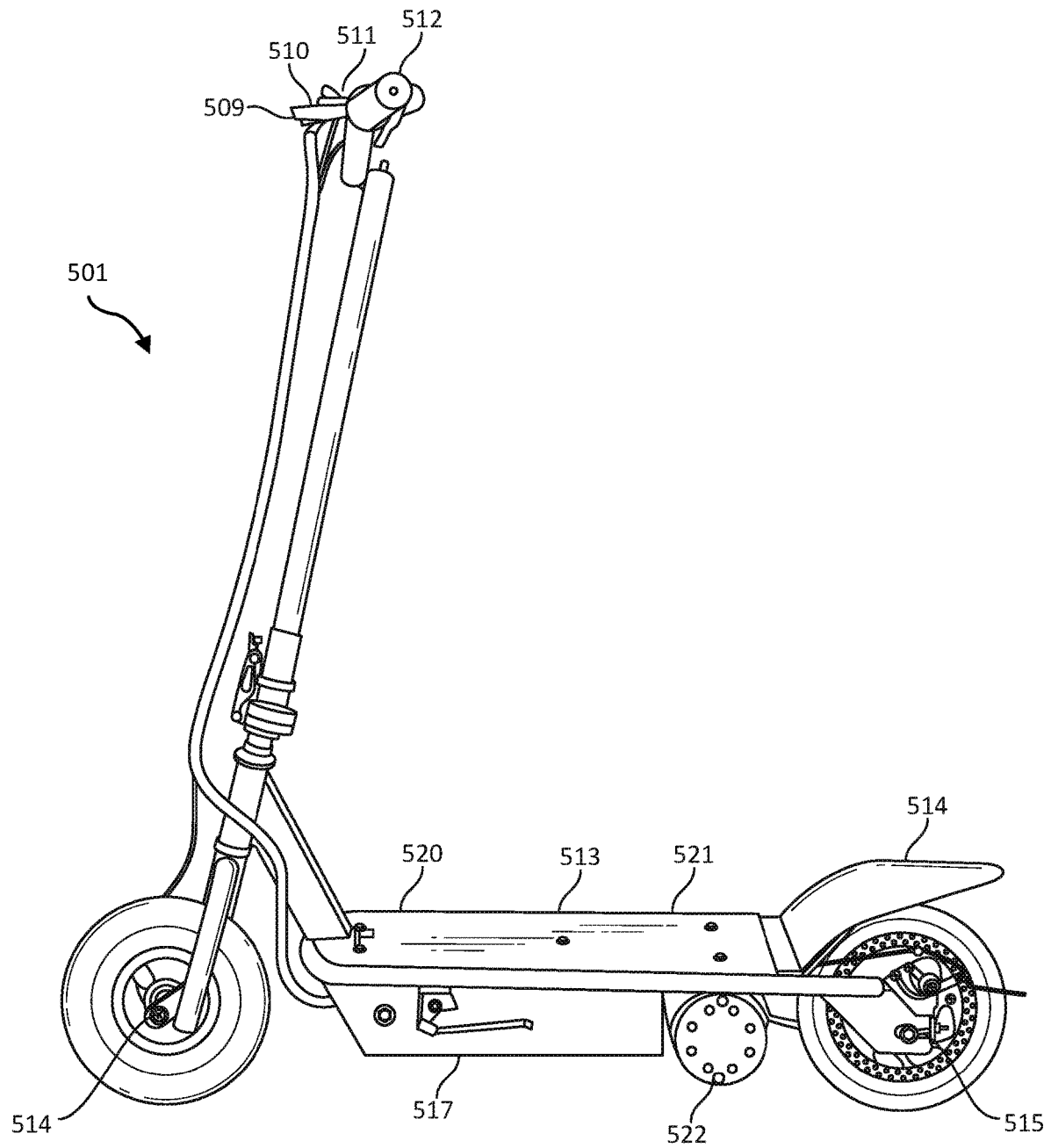
FIG. 5 is an illustration of sensors within a personal mobility vehicle.

FIG. 5 is an illustration of sensors within a PMV. As shown in FIG. 5, PMV 501 may include various sensors that collect data related to increasing safety during operation of PMV 501. In some examples, data collected from a device of the transportation requestor may be used to reduce a safety risk in operation of PMV 501. PMV 501 may include image sensors 510, 514 (e.g., a camera). Image sensor 510 may captures images in front of PMV 501 and images of a transportation requestor operating PMV 501. Image sensor 514 may captures images from the rear of PMV 501. Images captured by image sensors 510, 514 may be used to reduce safety risk by interpreting the environment in proximity to PMV 501. In some examples, image sensors 510, 514 may function to capture images which indicate a potential collision of PMV 501 with an object (e.g., vehicle, pedestrian, signpost, etc.). In response to capturing images which indicate a potential collision involving PMV 501, collision avoidance measures may be employed. Collision avoidance measures may include activation of a braking system on PMV 501 and/or activation of warnings to a transportation requestor including audio feedback, haptic feedback and visual feedback.

In some examples, PMV 501 may include echolocation sensor 509. Echolocation sensor 509 may function to detect objects in proximity to PMV 501. When echolocation sensor 509 detect objects which may collide with PMV 501, collision avoidance measures may be employed as described above. Echolocation sensor 509 may include, without limitation, a radar sensor, a lidar sensor, and an ultrasonic sensor.

In some examples, image sensor 510 may function to capture images of a transportation requestor. Images of the transportation requestor may be used to determine a level of focus and/or attention the transportation requestor is paying towards operating PMV 501. For example, image sensor 501 may capture images of a transportation requestor operating a device (e.g., smartphone) and determine whether operation of the device may increase a safety risk of PMV 501 operation. Image sensor 501 may determine if the transportation requestor operating PMV 501 is wearing safety equipment (e.g., safety helmet). In response, PMV 501 may provide feedback to the transportation requestor to wear safety equipment and/or increase attention and focus on PMV 501 operation. In response to determining the transportation requestor is not paying attention or operating PMV 501 in an unsafe manner, PMV 501 may decrease the speed of PMV 501 by applying the brakes and/or reducing power applied to a propulsion mechanism of PMV 501.

In some examples images of the transportation requestor captured by image sensor 510 may be used to determine a position of the transportation requestor on PMV 501. Image sensor 510 may determine the position will increase a safety risk of PMV 501 operation. In response, PMV 501 may provide feedback to the transportation requestor or decrease the speed of PMV 501 by applying the brakes and/or reducing power applied to a propulsion mechanism of PMV 501.

In some examples, PMV 501 may include weight sensor 521. Weight sensor 521 may function to determine the weight of a transportation requestor operating PMV 501. The weight of a transportation requestor operating PMV 501 may be used for various functions, including without limitation, matching transportation requestors to a PMV capable of safely handling the weight of the transportation requestor, controlling a speed of PMV 501 during operation on flat, uphill or downhill terrain, and controlling an anti-skid mechanism of PMV 501.

In some examples, PMV 501 may include torque sensor 522. Torque sensor 522 may function to determine the amount of torque applied to a drive mechanism of PMV 501. The torque sensor 522 may be used for various functions, including without limitation, controlling an amount of power delivered to a propulsion mechanism of PMV 501, controlling a charge level of a charge storage device of PMV

501, controlling a speed of PMV 501 during operation on flat, uphill or downhill terrain, and controlling an anti-skid mechanism of PMV 501.

In some examples, PMV 501 may include location sensor 512. Location sensor 512 may function to determine the location of PMV 501. The location of PMV 501 may be used for various functions, including without limitation, matching transportation requestors to PMV 501 for transportation service, determining a route the PMV is traveling, determining a type of terrain PMV 501 is operating on, determining if PMV 501 is operating in a geofence area, determining a distance to a destination of a transportation requestor, restricting a location of travel of PMV 501, and providing usage information to a dynamic transportation network. Location sensor 512 may include without limitation, a global navigation satellite system (e.g., global positioning system), Bluetooth™ low energy, dead reckoning, and radio wave triangulation (e.g., cellular and WiFi).

In some examples, PMV 501 may include biometric sensor 511. Biometric sensor 511 may function to detect characteristics of a transportation requestor operating PMV 501. Biometric sensor 511 may detect various characteristics of a transportation requestor, including but not limited to, a transportation requestor's fingerprint, iris, voice, pulse, blood pressure, face, body size, weight, body position, limb position, and gaze. Data collected from biometric sensor 511 may be used to reduce a safety risk in PMV operation in a variety of ways, including without limitation, authenticating a transportation requestor to operate PMV 501, determining a physical characteristic (e.g., height, weight, gender, age) of a transportation requestor operating PMV 501, and determining a health status (e.g., fatigue level) of a transportation requestor operating PMV 501. PMV 501 may use the characteristic information in a variety of ways, including without limitation, modifying a transportation function of PMV 501, locking and/or unlocking PMV 501, and reporting a potential health status risk.

In some examples, PMV 501 may include inclination sensor 513. Inclination sensor 513 may function to determine an angle of inclination of a terrain PMV 501 is operating on. Inclination sensor 513 may determine the angle of inclination (e.g., uphill, downhill, or flat) of the terrain and modify a transportation function of PMV 501 (as described in more detail below) in order to reduce a safety risk.

In some examples, PMV 501 may include front wheel rotation sensor 514 and rear wheel rotation sensor 515. Front wheel rotation sensor 514 and rear wheel rotation sensor 515 may function to determine a speed of PMV 501 and/or a state of operation of PMV 501. Wheel rotation sensors 514, 515 may determine a speed of PMV 501 is greater than a speed set for safe operation of PMV 501 and in response PMV 501 may reduce the speed by applying the brakes and/or reducing power applied to a propulsion mechanism of PMV 501. In some examples, front wheel rotation sensor 514 and rear wheel rotation sensor 515 may sense different rates of rotation during operation of PMV 501. When sensing different rates of wheel rotation PMV 501 may determine PMV 501 is not operating safely and in response an anti-skid control mechanism may be activated to bring PMV 501 back to a safe operating condition.

In some examples, PMV 501 may include charge level sensor 517. Charge level sensor 517 may function to determine a level of charge in a charge storage device (e.g. battery, capacitor, fuel cell, etc.) of PMV 501. PMV 501 may use the charge level to control a transportation function of PMV 501. For example, if the charge level is below a threshold, PMV 501 may reduce the speed of operation in order to conserve power and ensure the transportation requestor reaches their destination before depleting power. The charge level may also be used to determine a range of travel PMV 501 is capable of when matching a transportation requestor to PMV 501.

In some examples, PMV 501 may include inertial measurement sensor 520. Inertial measurement sensor 520 may function to determine a rate of linear and rotational acceleration of PMV 501. PMV 501 may use inertial measurement sensor 520 to control a transportation function of PMV 501. For example, inertial measurement sensor 520 may determine a pitch, yaw and/or roll direction of PMV 501 that indicates PMV 501 is not operating safely and/or is in an uncontrolled state. PMV 501 may use the pitch, yaw and/or roll information to control PMV 501 by controlling an anti-skid mechanism, a steering mechanism, a braking system and/or propulsion mechanism to bring PMV 501 back to a safe operating state. Inertial measurement sensor 520 may include a 3-directional axis accelerometer and a gyroscope. In some examples, inertial measurement sensor 520 may detect accelerations due to the effect of the terrain on PMV 501 and determine a type of terrain PMV 501 is operating on. In response, PMV 501 may adjust a maximum speed of PMV 501 and/or provide feedback the transportation requestor to move PMV 501 to a terrain which reduces a safety risk (e.g., a bike lane).

Figure 6:
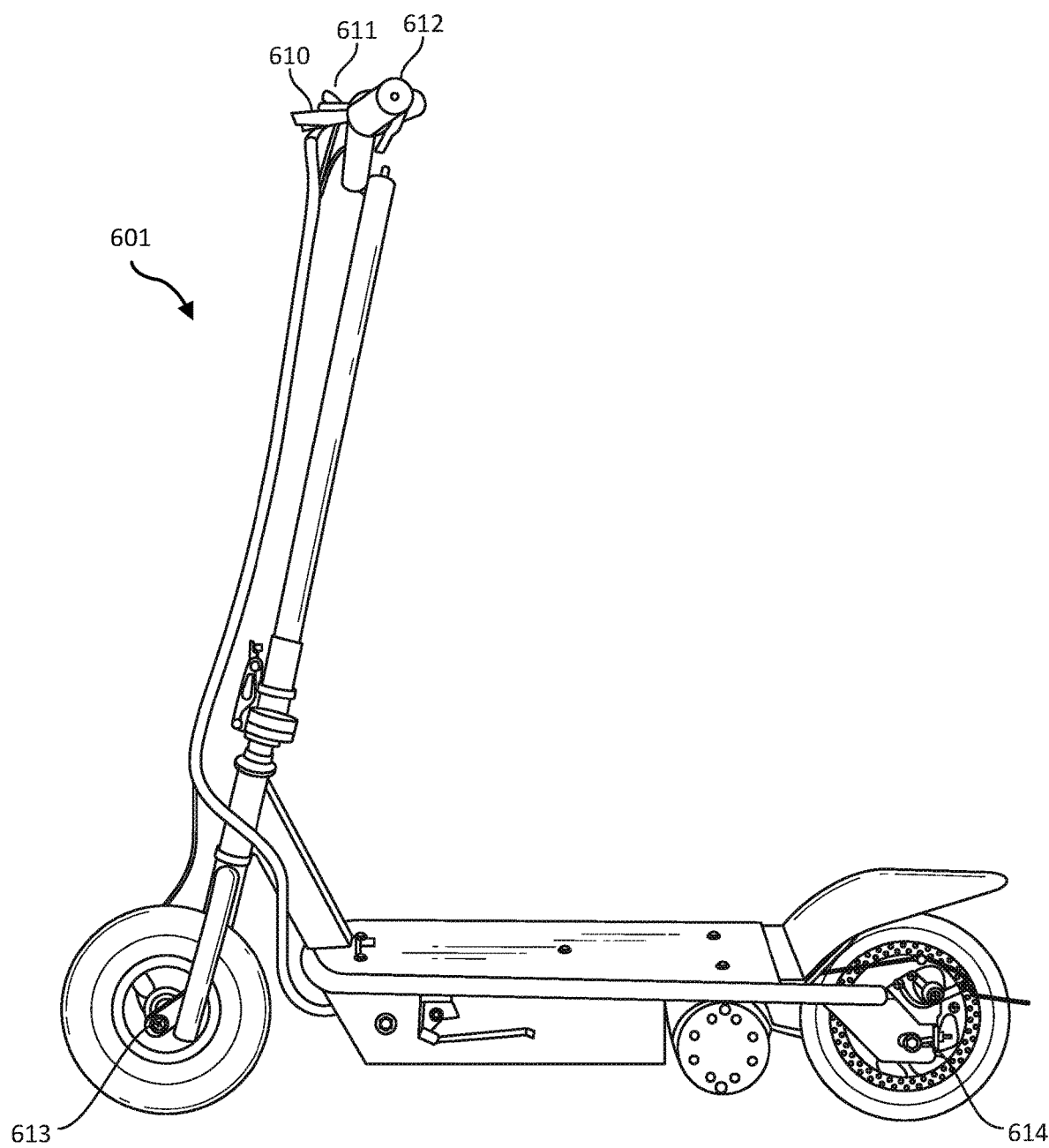
FIG. 6 is an illustration of operator feedback mechanisms within a personal mobility vehicle.

FIG. 6 is an illustration of operator feedback mechanisms within a personal mobility vehicle. While FIG. 6 shows PMV 601 as a scooter, other types of PMVs (bikes, unicycles, etc.) may have similar sensors and feedback mechanisms as one of ordinary skill in the art would appreciate. As shown in FIG. 6, PMV 601 may include haptic feedback actuator 612. In some examples, haptic feedback actuator 612 may function to provide haptic feedback to a transportation requestor operating PMV 601. Haptic feedback actuator 612 may provide a mechanical stimulation in the form of a vibration, force and/or motion to the transportation requestor. Haptic feedback actuator 612 may be integrated in the handgrips of PMV 601 and provide a mechanical stimulation to the hand(s) of the transportation requestor. Haptic feedback actuator 612 may provide feedback to a transportation requestor operating PMV 601 in response to an event that requires the transportation requestor's attention. For example, when PMV 601 has detected the transportation requestor is not operating PMV 601 safely and/or PMV 601 has detected a potential impending collision, feedback actuator 612 may provide feedback to the transportation requestor in order to draw attention to the event and instruct the transportation requestor to take corrective action In some examples, PMV 601 may include audio feedback speaker 610. Audio feedback speaker 610 may function to provide audio feedback in the form of an audible signal to a transportation requestor operating PMV 601. Audio feedback speaker 610 may provide an audible signal as a warning signal tone and/or spoken language instructions to the transportation requestor. Audio feedback speaker 610 may provide audio feedback to a transportation requestor operating PMV 601 in response to an event that requires the transportation requestor's attention. For example, when PMV 601 has detected the transportation requestor is not operating PMV 601 safely and/or PMV 601 has detected a potential impending collision, audio feedback speaker 610 may provide a warning signal tone and/or instructions to the transportation requestor in order to draw attention to the event and instruct the transportation requestor to take corrective action. For example, if the transportation requestor is not wearing a helmet, audio feedback speaker 610 may provide an audio message requesting the transportation requestor to wear a helmet. For example, if the transportation requestor is operating PMV 601 in a restricted and/or unsafe geographic area (e.g., sidewalk, outside a geofence, a construction zone, etc.), audio feedback speaker 610 may provide an audio message requesting the transportation requestor to redirect PMV 601 to an unrestricted and/or safe geographic area.

In some examples, PMV 601 may include visual feedback device 611. Visual feedback device 611 may function to provide visual feedback to a transportation requestor operating PMV 601. Visual feedback device 610 may provide a visual signal in a variety of methods including without limitation, a warning light, displayed graphics, and displayed messages. In some examples, visual feedback device 611 may include without limitation, a warning light, a display screen, a head's up display screen, and a head mounted display. Visual feedback device 611 may provide visual feedback to a transportation requestor operating PMV 601 in response to an event that requires the transportation requestor's attention. For example, when PMV 601 has detected the transportation requestor is not operating PMV 601 safely and/or PMV 601 has detected a potential impending collision, visual feedback device 611 may provide a visual warning signal and/or instructions to the transportation requestor in order to draw attention to the event and instruct the transportation requestor to take corrective action. For example, if the transportation requestor is not wearing safety equipment (e.g., a helmet), visual feedback device 611 may provide a graphic and/or text message requesting the transportation requestor to wear a helmet. For example, if the transportation requestor is operating PMV 601 in a restricted and/or unsafe geographic area (e.g., sidewalk, outside a geofence, a construction zone), visual feedback device 611 may provide visual feedback requesting the transportation requestor to redirect PMV 601 to an unrestricted and/or safe geographic area. In some examples, visual feedback device 611 may display a map guiding the transportation requestor to a destination by using a travel route which reduces a safety risk.

Figure 7:
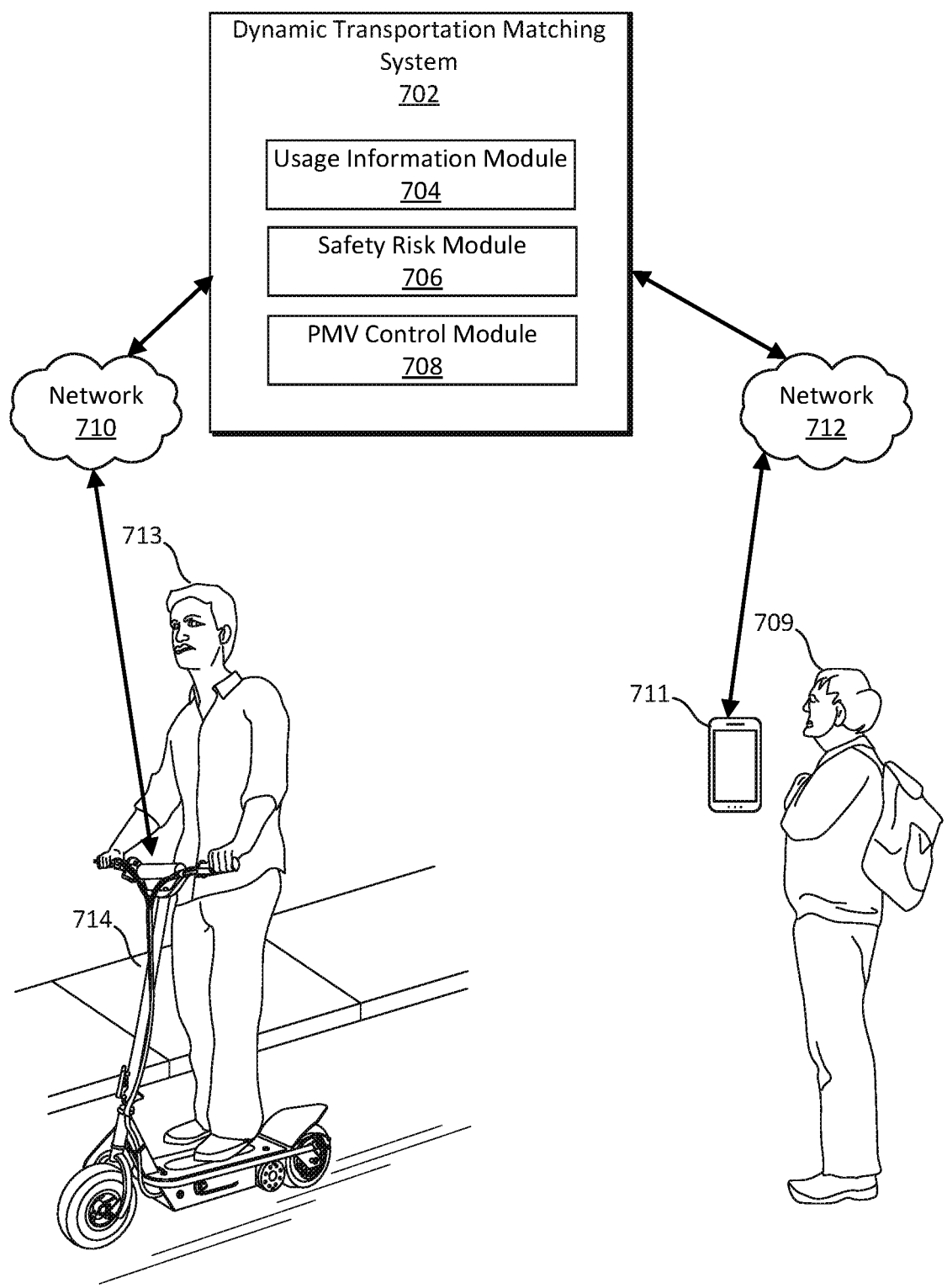
FIG. 7 is a block diagram of an example system that enables a guardian to control operating parameters of a personal mobility vehicle.

FIG. 7 is a block diagram of an example system that enables a guardian to control operating parameters of a personal mobility vehicle. In some examples, guardian 709 may be responsible for controlling a safety risk associated with transportation requestor 713. As shown in FIG. 7, guardian 709 may use guardian device 711 to communicate with dynamic transportation matching system 702 through network 712. PMV 714 may communicate with dynamic transportation matching system 702 through network 710. In some examples, guardian 709 may desire to control a safety risk associated with transportation requestor 713 operating PMV 714 by modifying at least one transportation function of PMV 714. In some examples, modifying a transportation function of PMV 714 may be based on settings provided by guardian device 711 to dynamic transportation matching system 702 over network 712. In some examples, modifying a transportation function of PMV 714 may include without limitation, setting a maximum operating speed of PMV 714, restricting a location of travel (e.g., within a geofence area, outside a geofence area) of PMV 714, locking PMV 714 to prevent operation, actuating a braking system of PMV 714, and controlling a steering system of PMV 714.

In some examples, guardian 709 may modify a transportation function of PMV 714 by interacting with a graphical user interface (GUI) on guardian device 711. Guardian 709 may enter a transportation function modification parameter(s) into a GUI on guardian 709 and communicate the modification parameter(s) to dynamic transportation matching system 702 through network 712. Usage information module 704 may provide usage information and characteristic information of the transportation requestor to safety risk module 706. Usage information may include, without limitation, the location of operation of PMV 714, a body position of the transportation requestor operating PMV 714, a state of focus of the transportation requestor, a type of terrain PMV 714 is operating on, and an ambient environmental condition (e.g., weather) of PMV 714. Characteristic information of the transportation requestor may include, without limitation, physical attributes (e.g., height, weight), age, gender, a skill level of operating a PMV, and an experience level of operating a PMV.

In some examples, safety risk module 706 may analyze the modification parameter(s) based on the provided usage information and transportation requestor characteristic information to determine a safety risk associated with the requested modification(s). Based on the determined safety risk, safety risk module 706 may provide the modification parameter(s) to PMV control module 708. PMV control module 708 may provide transportation function modification commands to PMV 714 over network 710. PMV control module 708 may base the commands on the requested transportation function modification and characteristics of PMV 714. Characteristics of PMV 714 may include, without limitation, a type of PMV, a type of propulsion mechanism, a charge level of a charge storage device, and a type of PMV control system.

Figure 8:
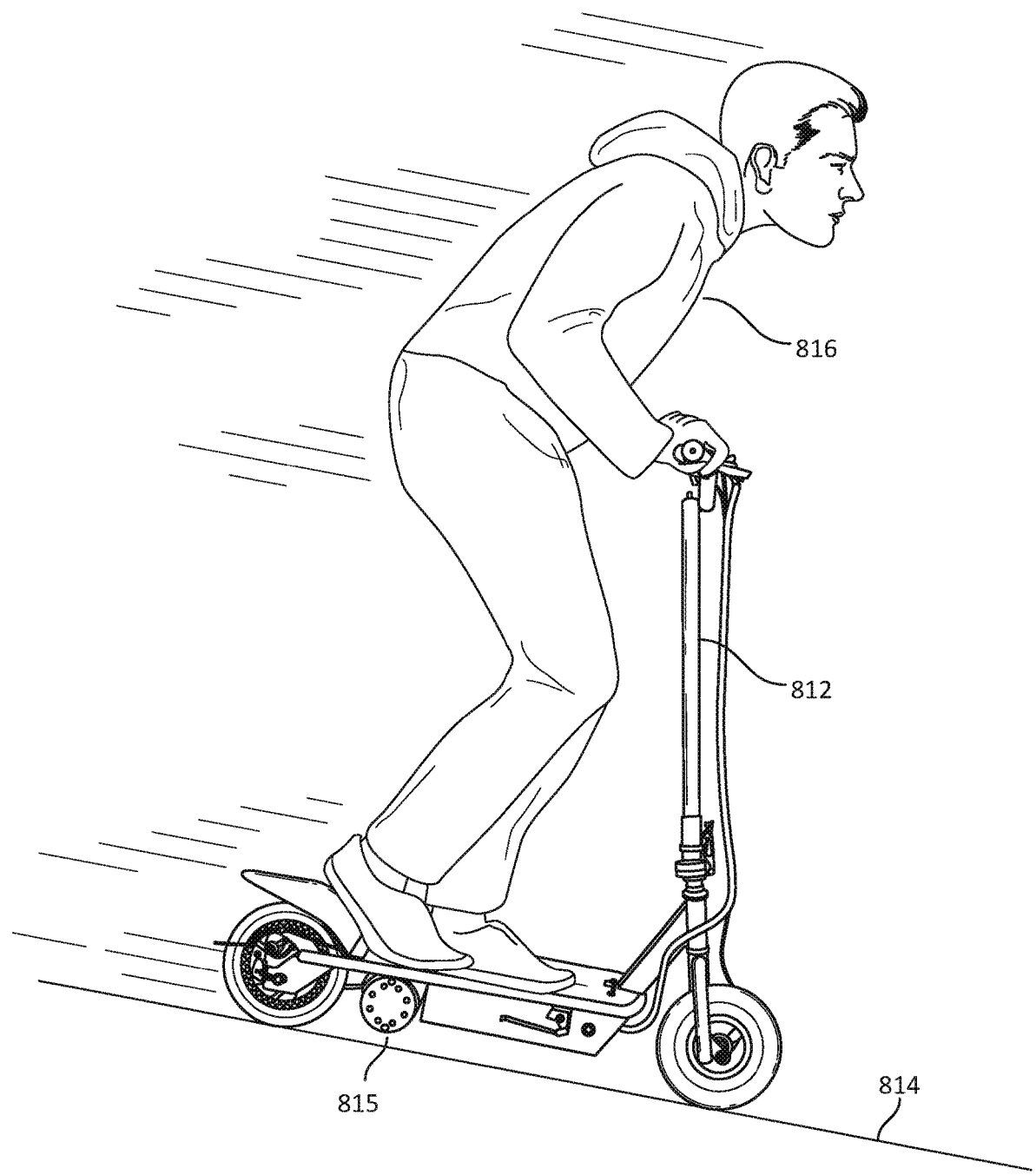
FIG. 8 is an illustration of a transportation requestor operating a personal mobility vehicle on an inclined terrain.

FIG. 8 is an illustration of a transportation requestor operating a PMV on an inclined terrain. As shown in FIG. 8, transportation requestor 816 is operating PMV 812 on downhill inclined terrain 814. In some examples, inclined terrain 814 may have a downhill incline which causes PMV 812 to operate at a speed which increases a safety risk. Inclined terrain 814 may cause PMV 812 to operate at a speed over a threshold which is determined to be proper for safe operation. The speed threshold determined safe for operation may be less than about 5 miles per hour, less than about 10 miles per hour, less than about 15 miles per hour, less than about 20 miles per hour, less than about 25 miles per hour, less than about 30 miles per hour, less than about 35 miles per hour, less than about 40 miles per hour, or less than about 45 miles per hour. In response to PMV 812 operating at a speed over a threshold determined safe for operation, PMV 812 may control the speed of operation to maintain the speed under the threshold. PMV 812 may control the speed of operation by applying a braking system, controlling a power level of a propulsion mechanism, changing a gear ratio of a transmission system, or a combination thereof. The speed determined for safe operation may be determined based on at least one of a physical attribute of the transportation requestor, a skill level of the transportation requestor associated with operating the PMV, an age of the transportation requestor, an experience level of the transportation requestor associated with operating the PMV, the geographic area of PMV operation, the inclination of the terrain, or the type of terrain. The speed determined for safe operation may be computed on a server and downloaded to the PMV and/or computed by a computing device in the PMV.

Figure 9:
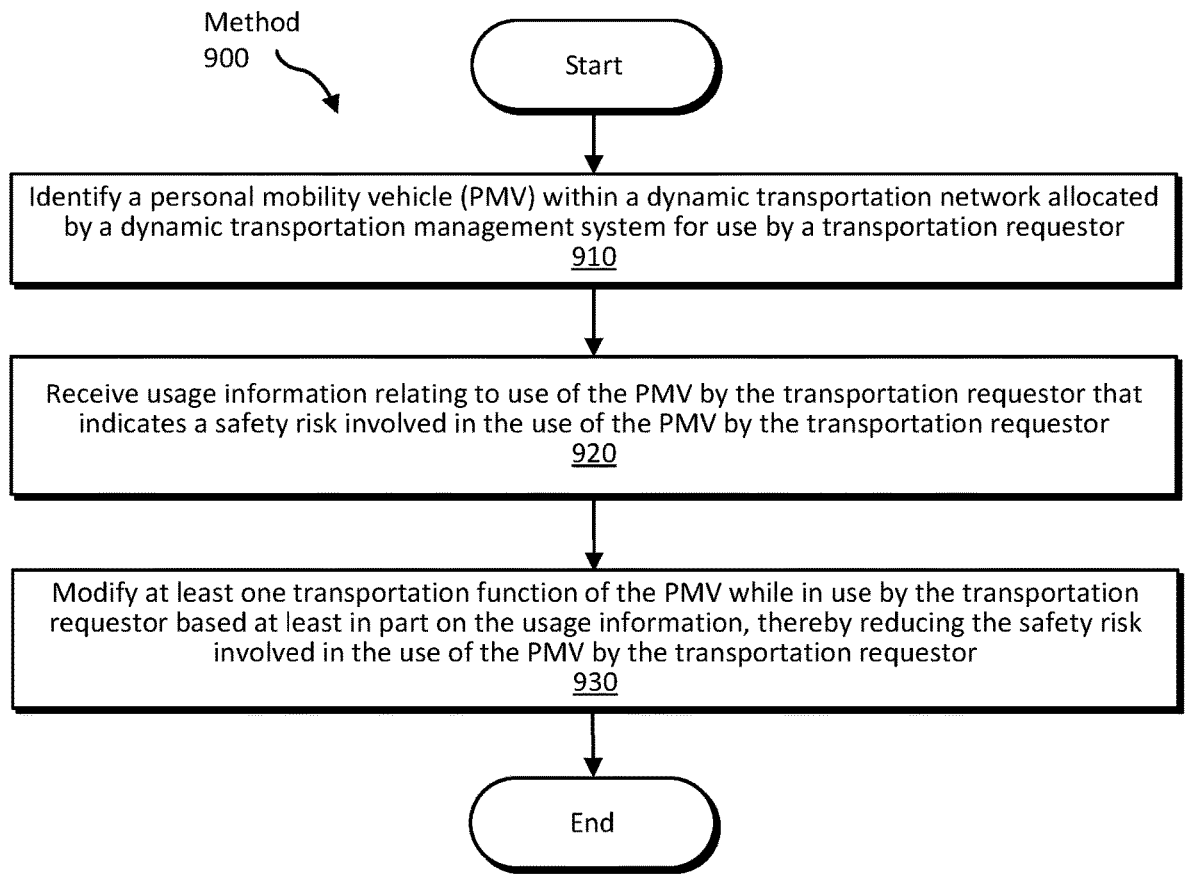
FIG. 9 is a flowchart of an example method for increasing safety in the operation of a personal mobility vehicle by a transportation requestor.

FIG. 9 is a flowchart of an example method for increasing safety in the operation of a personal mobility vehicle by a transportation requestor. As shown in FIG. 9, the method may include, at step 910, identifying a personal mobility vehicle (PMV) within a dynamic transportation network allocated by a dynamic transportation management system for use by a transportation requestor. At step 920, the method may include receiving usage information relating to use of the PMV by the transportation requestor that indicates a safety risk involved in the use of the PMV by the transportation requestor. At step 930, the method may include modifying at least one transportation function of the PMV while in use by the transportation requestor based at least in part on the usage information, thereby reducing the safety risk involved in the use of the PMV by the transportation requestor.

In some examples, modifying the at least one transportation function of the PMV while in use by the transportation requestor may comprise modifying a speed of the PMV.

In some examples, modifying the speed of the PMV may comprise controlling a power level of a propulsion mechanism of the PMV.

In some examples, the usage information relating to the use of the PMV may comprise at least one of a type of terrain the PMV is operating on, a route the PMV is operating on, an inclination of the terrain the PMV is operating on, a distance to a destination of the transportation requestor, or a charge level of a charge storage device providing power to a propulsion mechanism of the PMV.

In some examples, the method may further comprise providing, by the PMV, feedback to the user of the PMV based on the usage information.

In some examples, the usage information may comprise at least one of a location of travel of the PMV, a position of the user relative to the PMV while operating the PMV, a state of focus of the user while operating the PMV, a type of terrain the PMV is operating on, or ambient environmental conditions of the user while operating the PMV.

In some examples, the usage information is based on at least one characteristic of the transportation requestor.

In some examples, the at least one characteristic of the transportation requestor may comprise at least one of a physical attribute of the transportation requestor, a skill level of the transportation requestor associated with operating the PMV, an age of the transportation requestor, or an experience level of the transportation requestor associated with operating the PMV.

In some examples, the method may further comprise modifying at least one transportation function of the PMV based on settings provided to the dynamic transportation matching system by at least one of the transportation requestor and a guardian of the transportation requestor.

In some examples, the method may further comprise monitoring operation of the PMV by the transportation requestor, generating usage information based on monitoring the operation of the PMV by the transportation requestor, and modifying at least one transportation function of the PMV based on the generated usage information.

In some examples, the usage information is generated by collecting data associated with the operation of at least one PMV from at least one sensor, and processing the collected data, wherein the data is collected from at least one of an inertial sensor, an image sensor, an inclination sensor, a location sensor, a proximity sensor, a charge level sensor, a propulsion mechanism status sensor, a biometric sensor, a radio frequency identification sensor, a torque sensor, a radar sensor, or an ultrasonic sensor.

In some examples, receiving usage information relating to use of the PMV by the transportation requestor may comprise receiving information from a transportation requestor device associated with the transportation requestor.

In some examples, modifying the at least one transportation function of the PMV while in use by the transportation requestor may comprise at least one of setting a maximum speed of the PMV, restricting a location of travel of the PMV, locking the PMV, actuating a braking system of the PMV, or controlling a steering system of the PMV.

In some examples, the method may further comprise providing feedback to the transportation requestor related to the usage information, wherein the feedback comprises at least one of a haptic feedback, a message sent to the PMV, a message sent to a device of the transportation requestor, an audio feedback, or a visual feedback.

In some examples, the usage information may be based at least in part on historical data relating to transportation services provided to the transportation requestor within the dynamic transportation network.

In some examples, the usage information may be based at least in part on data relating to use of a PMV by other transportation requestors within the dynamic transportation network.

Figure 10:
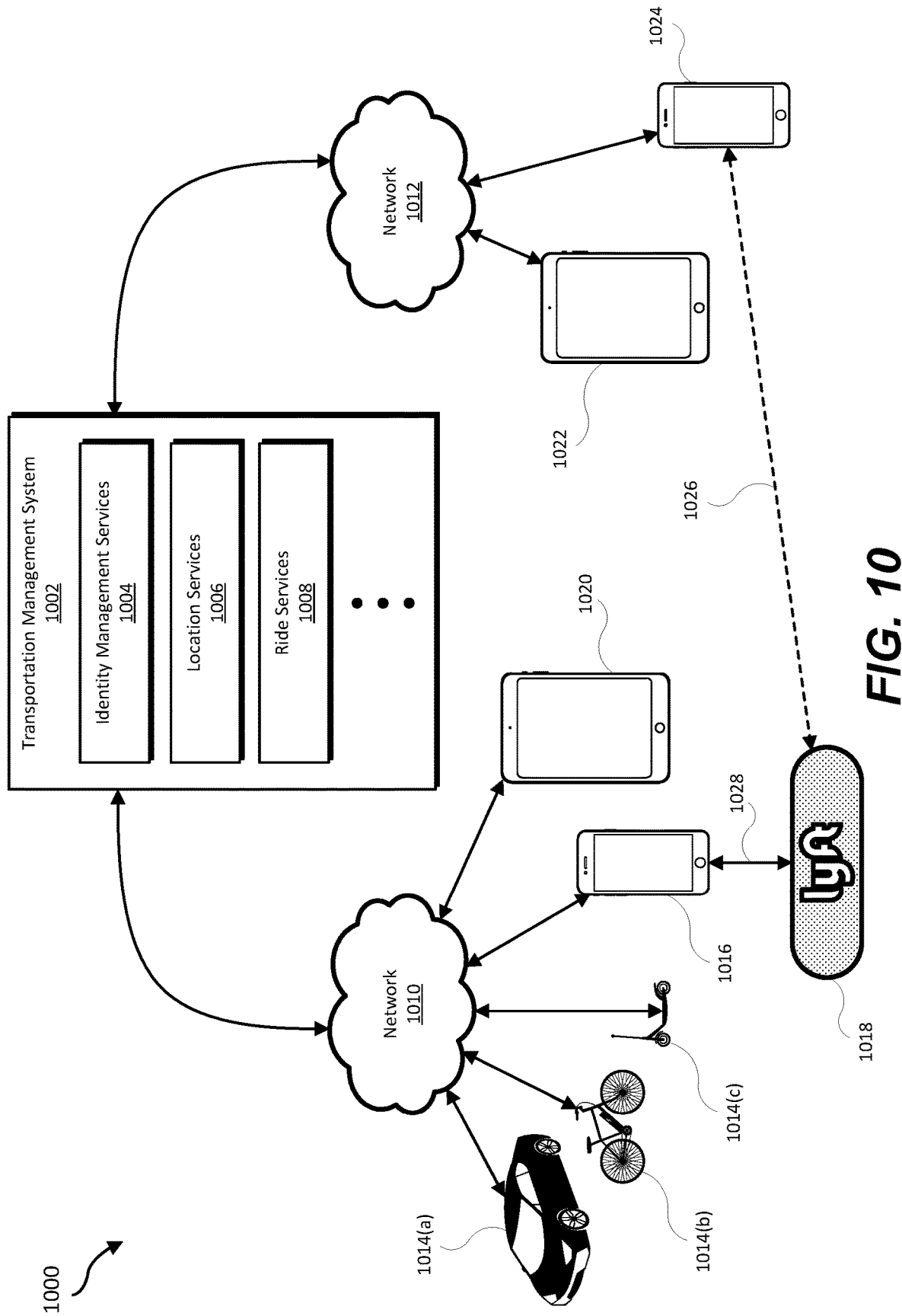
FIG. 10 is an illustration of an example transportation requestor and transportation provider management environment.

FIG. 10 shows a transportation management environment 1000, in accordance with various embodiments. As shown in FIG. 10, a transportation management system 1002 may run one or more services and/or software applications, including identity management services 1004, location services 1006, ride services 1008, and/or other services. Although FIG. 10 shows a certain number of services provided by transportation management system 1002, more or fewer services may be provided in various implementations. In addition, although FIG. 10 shows these services as being provided by transportation management system 1002, all or a portion of any of the services may be processed in a distributed fashion. For example, computations associated with a service task may be performed by a combination of transportation management system 1002 (including any number of servers, databases, etc.), one or more devices associated with a provider (e.g., devices integrated with managed vehicles 1014(*a*), 1014(*b*), and/or 1014(*c*); provider computing devices 1016 and tablets 1020; and transportation management vehicle devices 1018), and/or more or more devices associated with a ride requestor (e.g., the requestor's computing devices 1024 and tablets 1022). In some embodiments, transportation management system 1002 may include one or more general purpose computers, server computers, clustered computing systems, cloud-based computing systems, and/or any other computing systems or arrangements of computing systems. Transportation management system 1002 may be configured to run any or all of the services and/or software components described herein. In some embodiments, the transportation management system 1002 may include an appropriate operating system and/or various server applications, such as web servers capable of handling hypertext transport protocol (HTTP) requests, file transfer protocol (FTP) servers, database servers, etc.

In some embodiments, identity management services 1004 may be configured to perform authorization services for requestors and providers and/or manage their interactions and/or data with transportation management system 1002. This may include, e.g., authenticating the identity of providers and determining that they are authorized to provide services through transportation management system 1002. Similarly, requestors' identities may be authenticated to determine whether they are authorized to receive the requested services through transportation management system 1002. Identity management services 1004 may also manage and/or control access to provider and/or requestor data maintained by transportation management system 1002, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1002 may also manage and/or control access to provider and/or requestor data stored with and/or obtained from third-party systems. For example, a requester or provider may grant transportation management system 1002 access to a third-party email, calendar, or task management system (e.g., via the user's credentials). As another example, a requestor or provider may grant, through a mobile device (e.g., 1016, 1020, 1022, or 1024), a transportation application associated with transportation management system 1002 access to data provided by other applications installed on the mobile device. In some examples, such data may be processed on the client and/or uploaded to transportation management system 1002 for processing.

In some embodiments, transportation management system 1002 may provide ride services 1008, which may include ride matching and/or management services to connect a requestor to a provider. For example, after identity management services module 1004 has authenticated the identity a ride requestor, ride services module 1008 may attempt to match the requestor with one or more ride providers. In some embodiments, ride services module 1008 may identify an appropriate provider using location data obtained from location services module 1006. Ride services module 1008 may use the location data to identify providers who are geographically close to the requestor (e.g., within a certain threshold distance or travel time) and/or who are otherwise a good match with the requestor. Ride services module 1008 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1008 may use rule-based algorithms and/or machine-learning models for matching requestors and providers.

Transportation management system 1002 may communicatively connect to various devices through networks 1010 and/or 1012. Networks 1010 and 1012 may include any combination of interconnected networks configured to send and/or receive data communications using various communication protocols and transmission technologies. In some embodiments, networks 1010 and/or 1012 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1010 and/or 1012 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 1010 and/or 1012 may include any combination of networks described herein or any other type of network capable of facilitating communication across networks 1010 and/or 1012.

In some embodiments, transportation management vehicle device 1018 may include a provider communication device configured to communicate with users, such as drivers, passengers, pedestrians, and/or other users. In some embodiments, transportation management vehicle device 1018 may communicate directly with transportation management system 1002 or through another provider computing device, such as provider computing device 1016. In some embodiments, a requestor computing device (e.g., device 1024) may communicate via a connection 1026 directly with transportation management vehicle device 1018 via a communication channel and/or connection, such as a peer-to-peer connection, Bluetooth connection, NFC connection, ad hoc wireless network, and/or any other communication channel or connection. Although FIG. 10 shows particular devices communicating with transportation management system 1002 over networks 1010 and 1012, in various embodiments, transportation management system 1002 may expose an interface, such as an application programming interface (API) or service provider interface (SPI) to enable various third parties which may serve as an intermediary between end users and transportation management system 1002.

In some embodiments, devices within a vehicle may be interconnected. For example, any combination of the following may be communicatively connected: vehicle 1014, provider computing device 1016, provider tablet 1020, transportation management vehicle device 1018, requestor computing device 1024, requestor tablet 1022, and any other device (e.g., smart watch, smart tags, etc.). For example, transportation management vehicle device 1018 may be communicatively connected to provider computing device 1016 and/or requestor computing device 1024. Transportation management vehicle device 1018 may establish communicative connections, such as connections 1026 and 1028, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1002 using applications executing on their respective computing devices (e.g., 1016, 1018, 1020, and/or a computing device integrated within vehicle 1014), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1014 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1002. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 11:
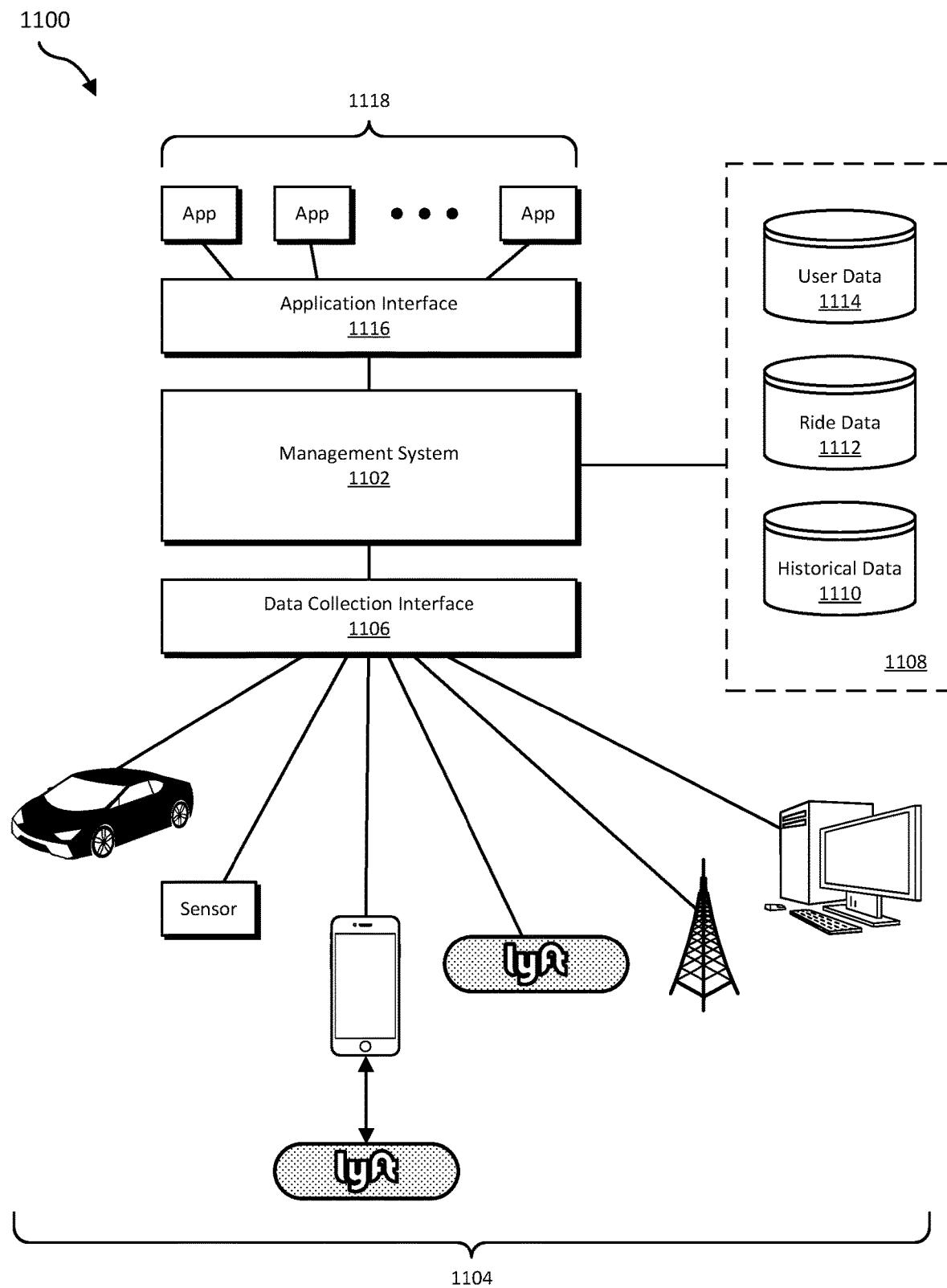
FIG. 11 is an illustration of an example data collection and application management system.

FIG. 11 shows a data collection and application management environment 1100, in accordance with various embodiments. As shown in FIG. 11, management system 1102 may be configured to collect data from various data collection devices 1104 through a data collection interface 1106. As discussed above, management system 1102 may include one or more computers and/or servers or any combination thereof. Data collection devices 1104 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1106 can include, e.g., an extensible device framework configured to support interfaces for each data collection device. In various embodiments, data collection interface 1106 may be extended to support new data collection devices as they are released and/or to update existing interfaces to support changes to existing data collection devices. In various embodiments, data collection devices may communicate with data collection interface 1106 over one or more networks. The networks may include any network or communication protocol as would be recognized by one of ordinary skill in the art, including those networks discussed above.

As shown in FIG. 11, data received from data collection devices 1104 can be stored in data store 1108. Data store 1108 may include one or more data stores, such as databases, object storage systems and services, cloud-based storage services, and other data stores. For example, various data stores may be implemented on a non-transitory storage medium accessible to management system 1102, such as historical data store 1110, ride data store 1112, and user data store 1114. Data stores 1108 can be local to management system 1102, or remote and accessible over a network, such as those networks discussed above or a storage-area network or other networked storage system. In various embodiments, historical data 1110 may include historical traffic data, weather data, request data, road condition data, or any other data for a given region or regions received from various data collection devices. Ride data 1112 may include route data, request data, timing data, and other ride related data, in aggregate and/or by requestor or provider. User data 1114 may include user account data, preferences, location history, and other user-specific data. Although certain data stores are shown by way of example, any data collected and/or stored according to the various embodiments described herein may be stored in data stores 1108.

As shown in FIG. 11, an application interface 1116 can be provided by management system 1102 to enable various apps 1118 to access data and/or services available through management system 1102. Apps 1118 may run on various user devices (including provider and requestor computing devices, such as those discussed above) and/or may include cloud-based or other distributed apps configured to run across various devices (e.g., computers, servers, or combinations thereof). Apps 1118 may include, e.g., aggregation and/or reporting apps which may utilize data 1108 to provide various services (e.g., third-party ride request and management apps). In various embodiments, application interface 1116 can include an API and/or SPI enabling third party development of apps 1118. In some embodiments, application interface 1116 may include a web interface, enabling web-based access to data 1108 and/or services provided by management system 1102. In various embodiments, apps 1118 may run on devices configured to communicate with application interface 1116 over one or more networks. The networks may include any network or communication protocol as would be recognized by one of ordinary skill in the art, including those networks discussed above, in accordance with an embodiment of the present disclosure.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, using a dynamic transportation management system, comprising:
    identifying a personal mobility vehicle (PMV) allocated by the dynamic transportation management system for use by a transportation requestor;
    determining an ability of the transportation requestor based on historical rides by the transportation requestor and user-supplied information provided by the transportation requestor to the dynamic transportation management system regarding previous riding experience of PMVs;
    customizing capabilities of the PMV based on the determined ability of the transportation requestor;

receiving sensor data from one or more sensors of the PMV while the PMV is being operated by the transportation requestor;

determining one or more usage information of the PMV based on the sensor data received from the one or more sensors of the PMV;

analyzing one or more modification parameters of the PMV based on the one or more usage information of the PMV; and modifying at least one transportation function of the PMV based on the analyzing of the one or more modification parameters based on the one or more usage information and the customized capabilities of the PMV.

2. The computer-implemented method of claim 1, wherein the sensor data from the one or more sensors of the PMV is collected from at least one of an inertial sensor, an image sensor, an inclination sensor, a location sensor, a proximity sensor, a charge level sensor, a propulsion mechanism status sensor, a biometric sensor, a radio frequency identification sensor, a torque sensor, a radar sensor, or an ultrasonic sensor.

3. The computer-implemented method of claim 1, further comprising:
determining a route for the transportation requestor to operate the PMV; and
determining the one or more usage information of the PMV based on the determined route.

4. The computer-implemented method of claim 1, further comprising:
determining one or more geofence for the transportation requestor to operate the PMV, wherein each area divided by the one or more geofence corresponds to a setting of the one or more modification parameters.

5. The computer-implemented method of claim 1, further comprising determining the one or more usage information of the PMV based on settings provided to the dynamic transportation management system by at least one of the transportation requestor or a guardian of the transportation requestor.

6. The computer-implemented method of claim 1, wherein modifying the at least one transportation function of the PMV comprises at least one of:
determining a maximum operating speed of the PMV;
determining a restriction location of travel of the PMV;
locking the PMV;
actuating a braking system of the PMV; or
controlling a steering system of the PMV.

7. The computer-implemented method of claim 1, wherein the one or more usage information of the PMV comprises at least one of:
a location of operation of the PMV;
a body position of the transportation requestor operating the PMV;
a state of focus of the transportation requestor;
a type of terrain the PMV is operating on; or
an ambient environmental condition of the PMV.

8. The computer-implemented method of claim 1, wherein the one or more usage information further comprises a usage profile associated with the transportation requestor.

9. The computer-implemented method of claim 8, wherein the usage profile associated with the transportation requestor comprises at least one of:
a physical attribute of the transportation requestor;
a skill level of the transportation requestor associated with operating the PMV;
an age of the transportation requestor; or
an experience level of the transportation requestor associated with operating the PMV.

10. The computer-implemented method of claim 1, wherein modifying the at least one transportation function of the PMV while in use by the transportation requestor comprises modifying a speed of the PMV.

11. The computer-implemented method of claim 10, wherein modifying the speed of the PMV comprises controlling a power level of a propulsion mechanism of the PMV.

12. The computer-implemented method of claim 1, wherein the one or more modification parameters of the PMV comprise at least one of a proposed operating speed of the PMV, a proposed operating location of travel of the PMV, a proposed steering of the PMV, or a proposed brake actuation of the PMV.

13. A system comprising:
one or more physical processors; and
one or more memories coupled to one or more of the physical processors, the one or more memories comprising instructions operable when executed by the one or more physical processors to cause the system to perform operations comprising:
identifying a personal mobility vehicle (PMV) allocated by a dynamic transportation management system for use by a transportation requestor;
determining an ability of the transportation requestor based on historical rides by the transportation requestor and user-supplied information provided by the transportation requestor to the dynamic transportation management system regarding previous riding experience of PMVs;
customizing capabilities of the PMV based on the determined ability of the transportation requestor;
receiving sensor data from one or more sensors of the PMV while the PMV is being operated by the transportation requestor;
determining one or more usage information of the PMV based on the sensor data received from the one or more sensors of the PMV;
analyzing one or more modification parameters of the PMV based on the one or more usage information of the PMV; and
modifying at least one transportation function of the PMV based on the analyzing of the one or more modification parameters based on the one or more usage information and the customized capabilities of the PMV.

14. The system of claim 13, wherein the sensor data from the one or more sensors of the PMV is collected from at least one of an inertial sensor, an image sensor, an inclination sensor, a location sensor, a proximity sensor, a charge level sensor, a propulsion mechanism status sensor, a biometric sensor, a radio frequency identification sensor, a torque sensor, a radar sensor, or an ultrasonic sensor.

15. The system of claim 13, wherein modifying the at least one transportation function of the PMV based on the analyzing comprises at least one of:
determining a maximum operating speed of the PMV;
determining a restriction location of travel of the PMV;
locking the PMV;
actuating a braking system of the PMV; or
controlling a steering system of the PMV.

16. The system of claim 13, wherein the one or more usage information of the PMV comprises at least one of:
a location of operation of the PMV;
a body position of the transportation requestor operating the PMV;

a state of focus of the transportation requestor;
a type of terrain the PMV is operating on; or
an ambient environmental condition of the PMV.

17. The system of claim 13, wherein the one or more modification parameters of the PMV comprise at least one of a proposed operating speed of the PMV, a proposed operating location of travel of the PMV, a proposed steering of the PMV, or a proposed brake actuation of the PMV.

18. A non-transitory computer-readable storage medium comprising computer-readable instructions that, when executed by at least one processor of a computing device, cause the computing device to:
identify a personal mobility vehicle (PMV) allocated by a dynamic transportation management system for use by a transportation requestor;
determine an ability of the transportation requestor based on historical rides by the transportation requestor and user-supplied information provided by the transportation requestor to the dynamic transportation management system regarding previous riding experience of PMVs;
customize capabilities of the PMV based on the determined ability of the transportation requestor;
receive sensor data from one or more sensors of the PMV while the PMV is being operated by the transportation requestor;
determine one or more usage information of the PMV based on the sensor data received from the one or more sensors of the PMV;
analyze one or more modification parameters of the PMV based on the one or more usage information of the PMV; and
modify at least one transportation function of the PMV based on the analyzing of the one or more modification parameters based on the one or more usage information and the customized capabilities of the PMV.

19. The method of claim 1, further comprising:
calculating an ability score for the transportation requestor based on the historical rides by the transportation requestor and the user-supplied information regarding the previous riding experience of PMVs; and
unlocking a higher maximum speed for the PMV based on determining that the ability score of the transportation requestor exceeds a predetermined threshold.

20. The method of claim 19, wherein the ability score is calculated based on one or more of: a number of PMV rides by the transportation requestor, a number of successful rides by the transportation requestor, a monitored behavior of the transportation requestor operating PMVs, an amount of time by the transportation requestor operating PMVs, a number of PMV function modifications in response to the transportation requestor's operation of PMVs, recency of PMV function modification in response to the transportation requestor's operation of PMVs, and wherein the user-supplied information comprises a comfort level with operating PMVs.

* * * * *